US006829727B1

(12) United States Patent
Pawloski

(10) Patent No.: US 6,829,727 B1
(45) Date of Patent: Dec. 7, 2004

(54) IN-CIRCUIT EMULATION OF SINGLE CHIP MICROCONTROLLERS

(75) Inventor: Martin B Pawloski, Scottsdale, AZ (US)

(73) Assignee: Metalink Corp., Chandler, AZ (US)

( * ) Notice: Subject to any disclaimer, the term of this patent is extended or adjusted under 35 U.S.C. 154(b) by 329 days.

(21) Appl. No.: 09/759,577

(22) Filed: Jan. 12, 2001

(51) Int. Cl.[7] .............................................. G06F 11/00
(52) U.S. Cl. ............................ 714/28; 714/31; 714/33; 703/28
(58) Field of Search ............................. 714/28, 40, 31, 714/33, 27; 703/28

(56) References Cited

U.S. PATENT DOCUMENTS

| 5,313,618 A | * | 5/1994 | Pawloski ..................... 703/28 |
| 5,802,347 A | * | 9/1998 | Yabumoto .................... 703/27 |
| 5,954,824 A | * | 9/1999 | Cherichetti et al. ........... 714/28 |
| 5,960,190 A | * | 9/1999 | MacKenna ................... 703/28 |
| 5,964,890 A | * | 10/1999 | Inui et al. ..................... 714/28 |
| 6,094,729 A | * | 7/2000 | Mann .......................... 714/25 |
| 6,167,365 A | * | 12/2000 | Karthikeyan et al. ......... 703/28 |
| 6,233,673 B1 | * | 5/2001 | Higashida ................... 712/227 |
| 6,516,428 B2 | * | 2/2003 | Wenzel et al. ................ 714/28 |
| 6,523,148 B1 | * | 2/2003 | Junghans .................... 714/797 |
| 6,571,356 B1 | * | 5/2003 | Mehr et al. ................... 714/28 |
| 6,598,176 B1 | * | 7/2003 | Tago ............................ 714/28 |
| 2002/0007264 A1 | * | 1/2002 | Swoboda ..................... 703/28 |
| 2002/0062461 A1 | * | 5/2002 | Nee et al. .................... 714/28 |
| 2002/0099977 A1 | * | 7/2002 | Wong .......................... 714/28 |

* cited by examiner

Primary Examiner—Robert Beausoliel
Assistant Examiner—Yolanda L Wilson

(57) ABSTRACT

An in-circuit emulation system consisting of an emulation base and a slightly modified, flash-based COP8 architecture microcontroller. In addition to the flash memory where the User's program resides, the COP8 device includes a small ROM area with a monitor program that is used to communicate commands and data with the emulation base. Two new instructions are added, one for entering the ROM area and one for exiting it. A small set of the COP8 device's digital pins are modified to allow data, status and control to be exchanged between the COP8's CPU and the emulation base. These modified COP8 pins are recreated by the emulation base so that emulation occurs with the COP8's full complement of I/O. The content of the signals shared between the COP8 and the emulation base allows for a full range of emulation capabilities. The COP8 device is emulated in situ on the printed circuit board providing accurate operation of precision peripherals and environmental variables. The signals shared with the emulation base are routed to a standard, simple connector. The connector is configured so that the printed circuit board can be easily switched between a development system and a production system.

39 Claims, 10 Drawing Sheets

FIGURE 6. OUTPUT PIN FIELD LAYOUT
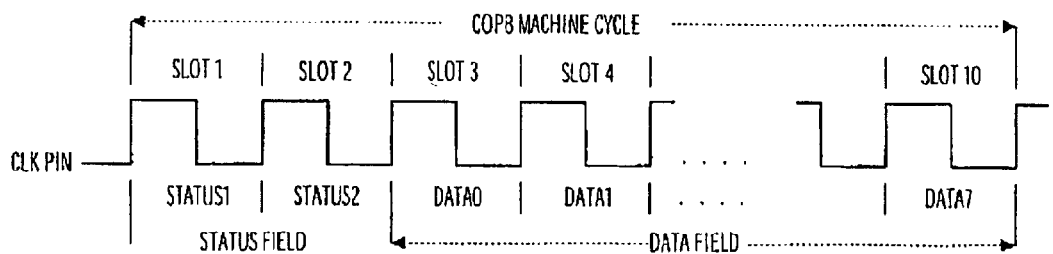
FIGURE 7. TYPE 1 WAVEFORM
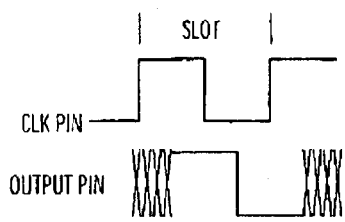
FIGURE 8. TYPE 2 WAVEFORM
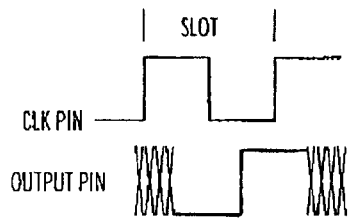
FIGURE 9. TYPE 3 WAVEFORM
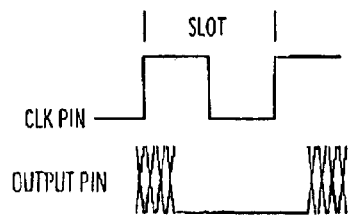

FIGURE 10. TYPE 4 WAVEFORM
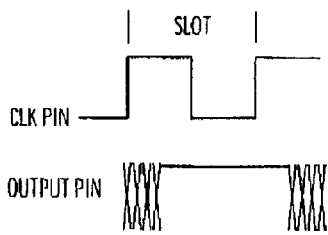
FIGURE 11. POUT PIN FIELD LAYOUT
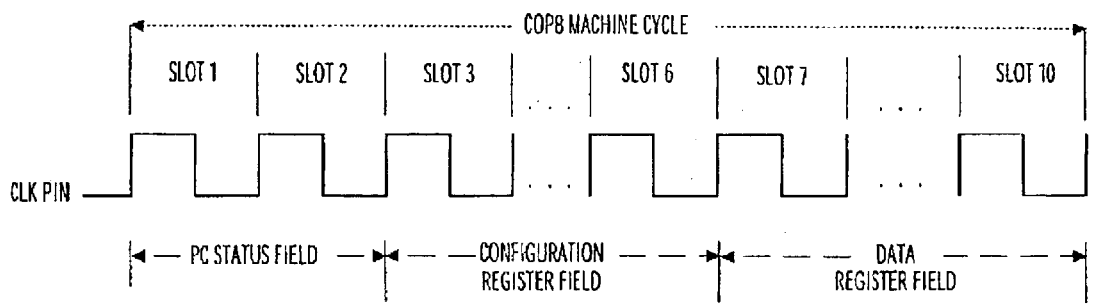
FIGURE 12. INPUT PIN FIELD LAYOUT
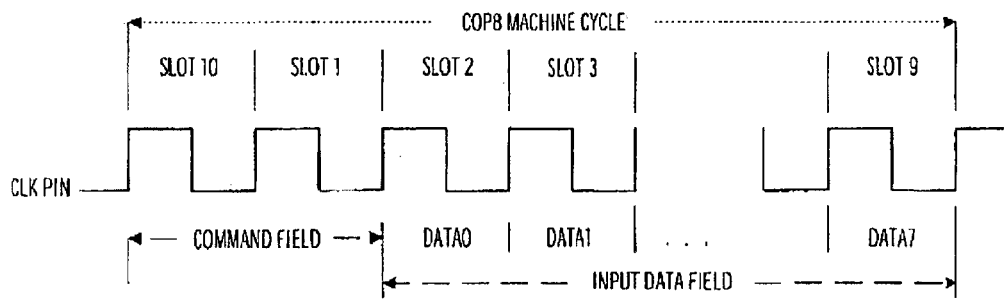

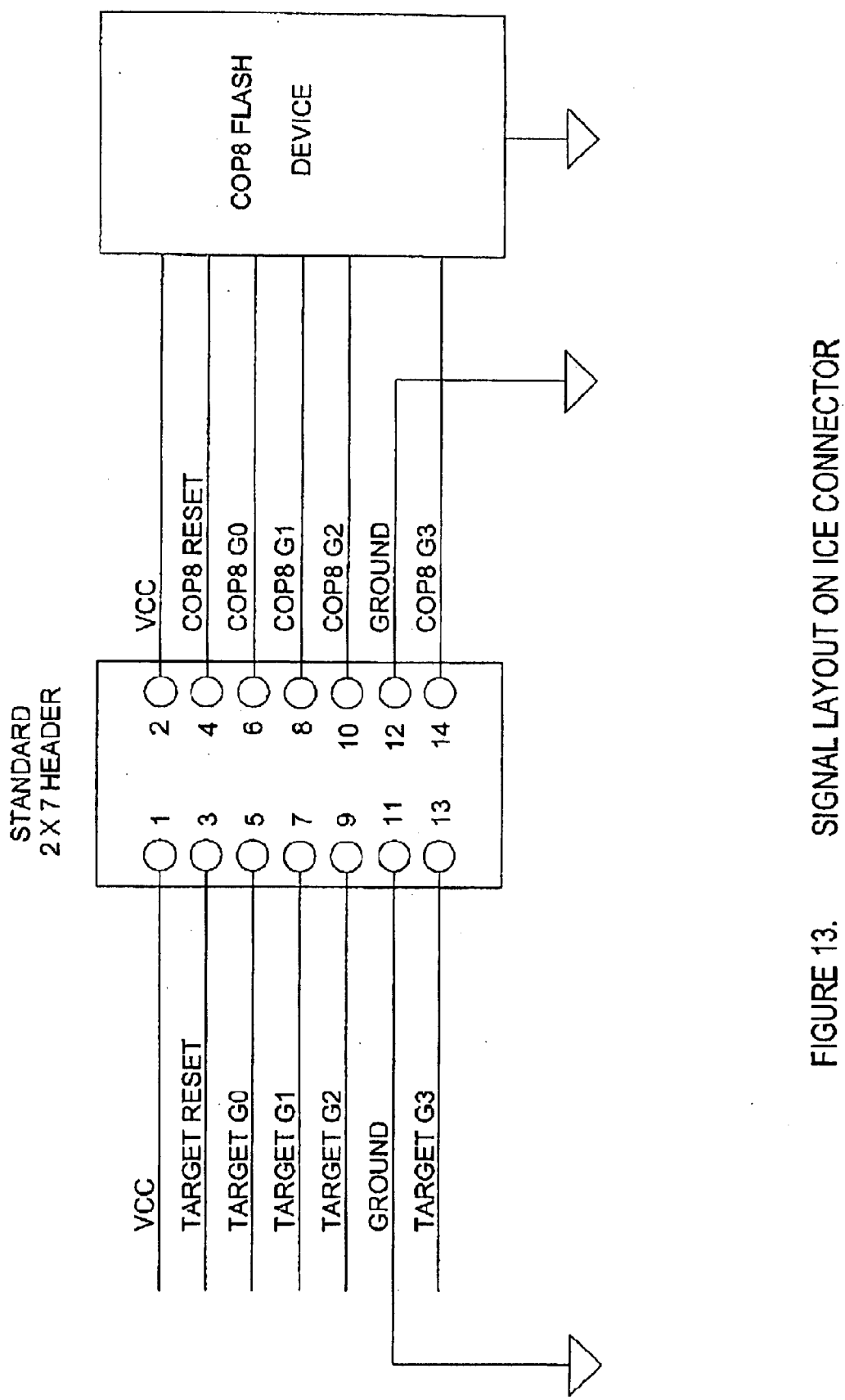
FIGURE 13.  SIGNAL LAYOUT ON ICE CONNECTOR

IN-CIRCUIT EMULATION OF SINGLE CHIP MICROCONTROLLERS

BACKGROUND OF THE INVENTION

1. Field of the Invention

This invention relates to the in-circuit emulation of microprocessors, specifically to an improved method of emulating COP8® microcontrollers.

2. Related Art

It is generally recognized that real-time in-circuit emulators (ICE) are a desirable, and in many cases, a necessary tool for engineers involved in designing applications that use an embedded microprocessor. An ICE allows the engineer to exercise direct control over the execution of his application program being run on the microprocessor. This control enables the engineer to determine if a program is performing as expected, and in the case where it is not, the ICE makes it much easier to debug the program.

An ICE typically has some type of probe that replaces the actual microprocessor on the engineer's application printed circuit board. Through an interface, usually hosted on a standard Personal Computer, an engineer can use the ICE to view and modify the microprocessor's internal state, start his program at specific locations, stop his program at specific locations or events or view a snapshot of his program's execution history.

An ICE is designed around the address and data bus of the microprocessor. It monitors and controls the flow of addresses and data on the microprocessor's busses and thereby provides the features used by the engineer to control, test and debug a program. However, a special case arises with a class of embedded microprocessors called single chip microcontrollers such as the National Semiconductor COP8 family. There is no address and data bus. These microcontrollers execute their program out of an internal non-volatile code memory such as a ROM, EPROM or Flash.

To provide the advantages of an ICE to their customers, microcontroller manufacturers generally develop a special version of the single chip microcontroller, called a Bond Out chip. A Bond Out chip disables the internal code memory of the single chip microcontroller and brings out the internal address and data bus on extra pins. Using extra pins allows the address and data bus to be available to the ICE while at the same time preserving the chip's I/O that the user's application is using. These Bond Out chips are made available to ICE manufacturers so they can develop an ICE for the chip.

While a Bond Out chip allows an ICE to be built for a single chip microcontroller, it nonetheless has several disadvantages. First, because of the extra pins needed, it is packaged in a larger package than the standard production microcontroller. This means that it cannot be used in the site that the production part will occupy on the target system. Rather the Bond Out chip is placed on an ICE Probe or resides in the ICE base unit and the pin signals are connected to the target system through a cable or an adapter. Not operating in the actual application board site causes severe degradation of analog signals and often limits the environmental parameters (e.g., temperature) in which the system can be emulated and debugged.

A second disadvantage of the Bond Out chip is its higher cost, which in some cases can be as high as ten times the cost of the production microcontroller. Several factors contribute to the cost of a Bond Out chip. One is the relatively low volume of the part. While a typical microcontroller in production can run in the millions of units per year, Bond Out chip consumption typically numbers in the tens to hundreds of units per year. Also, cost is added to the Bond Out chip by its use of larger packaging and special test flow due to the extra pins and associated functionality. This results in a more expensive emulator and a higher cost of repair (the most common failure in an ICE system is the Bond Out chip).

A third disadvantage is that over the lifetime of the product, it is not unusual for the Bond Out chip's operating parameters and functionality to diverge from the production part. The production part is always the focus of improvements through bug fixes, yield improvements and die shrinks. The Bond Out, due to its limited use, often doesn't share in these improvements. This most commonly happens in cases where the Bond Out is physically a separate die, although it can also happen where the Bond Out is a package option due to limitations on test development resources. When this divergence occurs, the ICE becomes less useful as a real-time emulator.

A fourth disadvantage is that a new Bond Out chip is required when the semiconductor manufacturer decides to add new functionality to a microcontroller by designing and producing new versions of the microcontroller. A new Bond Out is required for each new functional variation. While a new Bond Out chip is not needed if the new variation of the microcontroller is simply less memory or fewer IO pins, it is required whenever new on-chip peripherals or new I/O interfaces are added, or when there are architectural enhancements. This can get particularly burdensome when one considers that usually two to four new, functionally different microcontrollers are introduced every year for common and popular microcontroller architectures.

These different functional variations also impact the ICE manufacturer, since a new ICE Probe has to be designed for each new Bond Out chip. In addition to the development costs involved, it also delays the availability of the ICE for many months while the ICE system with the new Probe is debugged, tested and released to production. This prevents early users of the microcontroller from being able to develop their applications with the aid of an ICE. Since many design engineers will not use a microcontroller unless there is an ICE available for it, this delay can also slow the acceptance of a new microcontroller.

SUMMARY OF THE INVENTION

Objects of the Invention

1. An object of one aspect of the invention is to provide circuitry in a modified COPS to allow real-time in-circuit emulation without the need of an address/data bus or Bond Out chip by using the standard production microcontroller.
2. An object of one aspect of the invention is to allow emulation of microcontrollers with integrated high performance analog peripherals without degrading the analog performance.
3. An object of one aspect of the invention is to allow emulation of the COP8 in the actual environment in which it is going to be used without having to "ruggedize" the emulator to handle hostile conditions.
4. An object of one aspect of the invention is to allow the user's target system to be easily switched by means of a standard, simple connector between a development system that interfaces to the emulator and a final production system that can be shipped to a customer.

5. An object of one aspect of the invention is to provide circuitry in a modified COP8 to allow a range of emulators.
6. An object of one aspect of the invention is to require a minimal number of modified COP8 pins needed to interface to the emulator to allow for small pin count microcontrollers.
7. An object of one aspect of the invention is not to rely on an external clock as a timing source and be clocking scheme independent.
8. An object of one aspect of the invention is to be able to detect internal Resets so as to allow emulation of COP8 microcontrollers without an external Reset pin.
9. An object of one aspect of the invention is the ability to recreate the COP8 digital pins that interface to the emulator and that these pins can have multiplexed functionality, not just simple digital I/O.
10. An object of one aspect of the invention is to allow the use of on-chip flash memory and allow in-system programming during emulation.
11. An object of one aspect of the invention is to provide for communication between the emulator and an on-chip monitor program to allow full visibility to the state of the microcontroller.

Briefly, the present invention provides a system and method of providing real-time in-circuit emulation of a COP8 microcontroller using the standard production device directly soldered or otherwise connected on the application's printed circuit board. The system of the present invention, as shown in FIG. 2, contemplates three major blocks. The first block is a flash-memory based microcontroller 201 having a slightly modified COP8 architecture. The second block is the emulator logic, the ICE Logic 202, and the third block is the Control Processor 203 that interfaces between the ICE Logic and the user interface running on a standard Personal Computer.

One embodiment of a method of the present invention uses four digital pins of a flash-memory based COP8 microcontroller that are reconfigured in emulation mode to output clock, status and data to the ICE Logic and an input pin to input commands and data from the ICE Logic. The input pin's data communicates with a small ROM-based monitor in the COP8 and provides a means of inputting and outputting the internal state of the machine as well as programming the flash memory in-circuit. Those skilled in this field and having the benefit of the present disclosure will understand that although the term "pin" is used, the present invention is not limited to use with microcontrollers having pins, but may be used with any type of mechanism by which electrical connection is made to a packaged semiconductor device, including but not limited to solder bumps, solders balls, and lands.

The system and method allow a user sitting at his Personal Computer to use the system as a fully functional, real-time in-circuit emulator. The user will be able to load and patch his program in the on-chip flash of the COP8; run the program or single step through it, set breakpoints; view and change the state of any user-visible memory or register. In addition, optional functions can be added to provide additional debugging capabilities such as code trace and hardware attributes.

BRIEF DESCRIPTION OF THE DRAWINGS

FIG. 6 shows the OUTPUT pin field layout.

FIG. 7 shows a Type 1 waveform.

FIG. 8 shows a Type 2 waveform.

FIG. 9 shows a Type 3 waveform.

FIG. 10 shows a Type 4 waveform.

FIG. 11 shows the POUT pin field layout.

FIG. 12 shows the INPUT pin field layout.

FIG. 13 shows the signal layout on the ICE Logic connector.

DETAILED DESCRIPTION

Figure 1A:
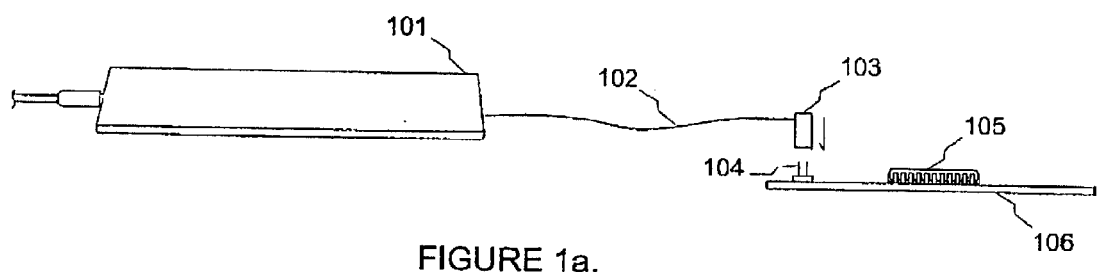
FIG. 1 is a pictorial view of the emulation system, including the ICE, the COP8 and an application printed circuit board.
Figure 1B:
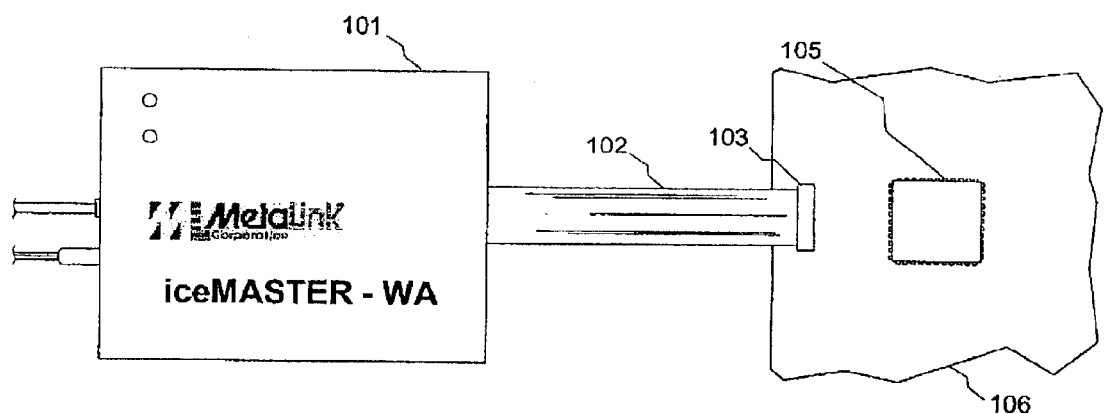
Figure 2:
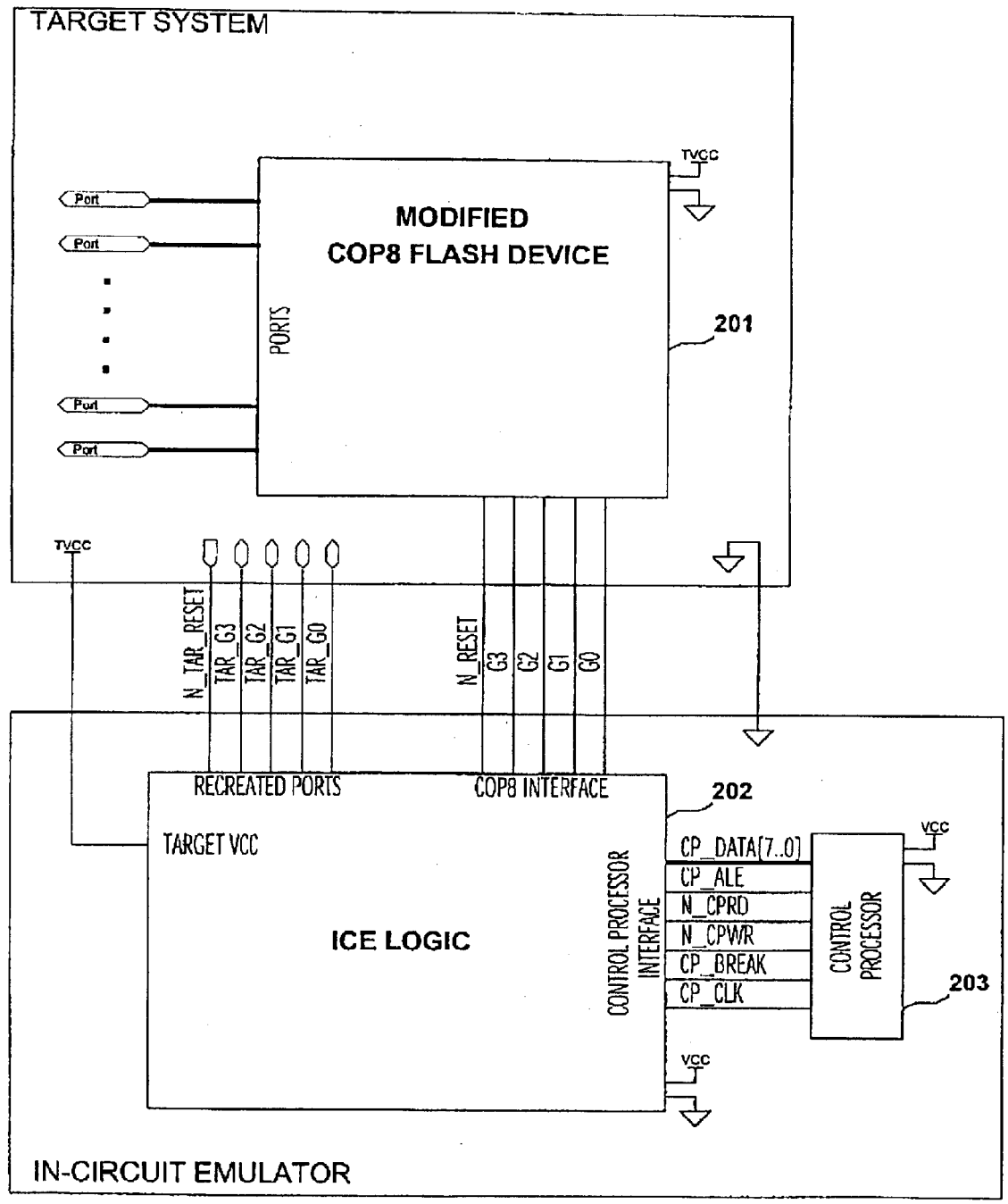
FIG. 2 is a block diagram of the emulation system, including the ICE, the COP8 and the application.
Figure 3:
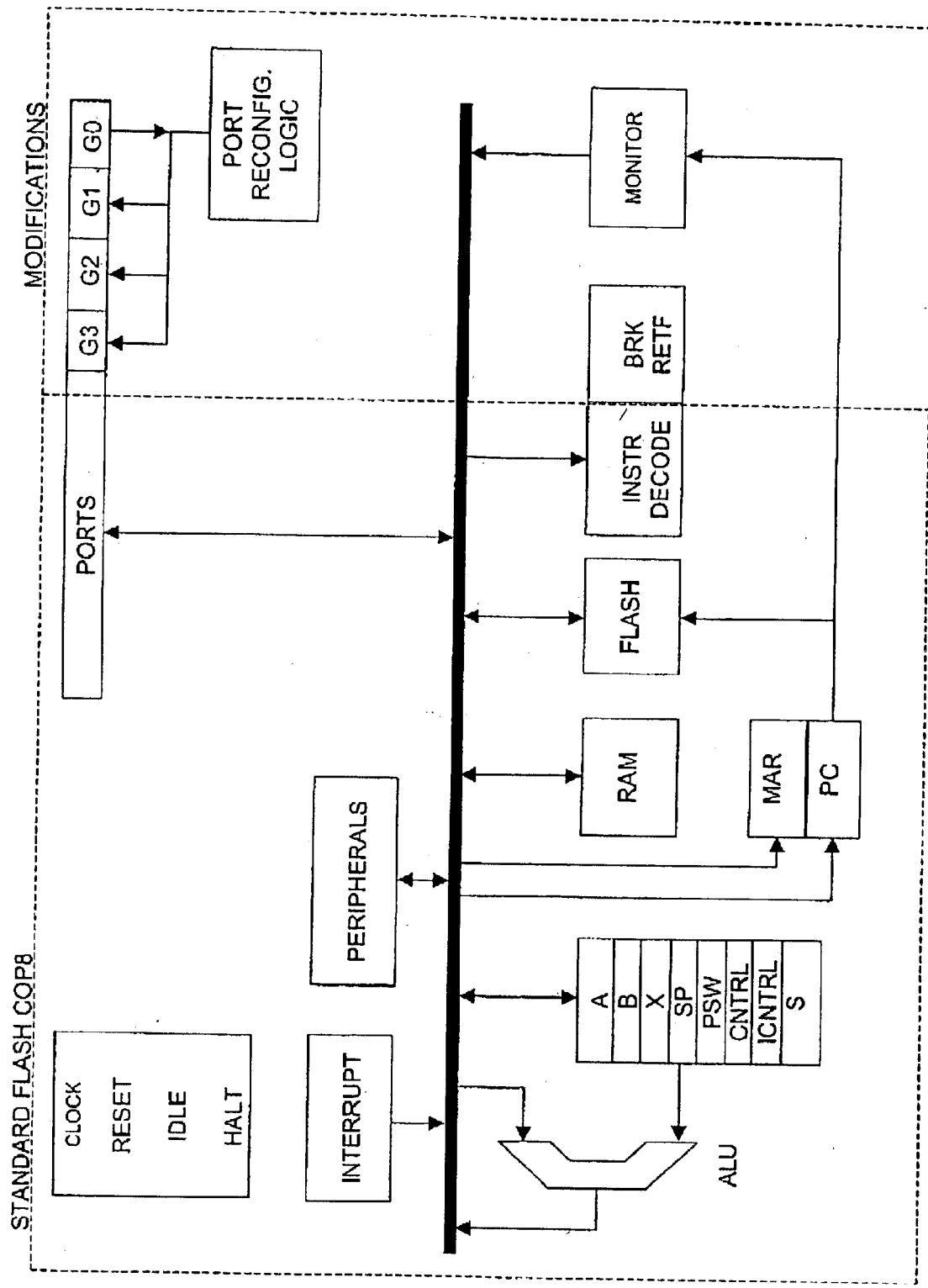
FIG. 3 is a block diagram of a microcontroller in accordance with the present invention.
Figure 4A:
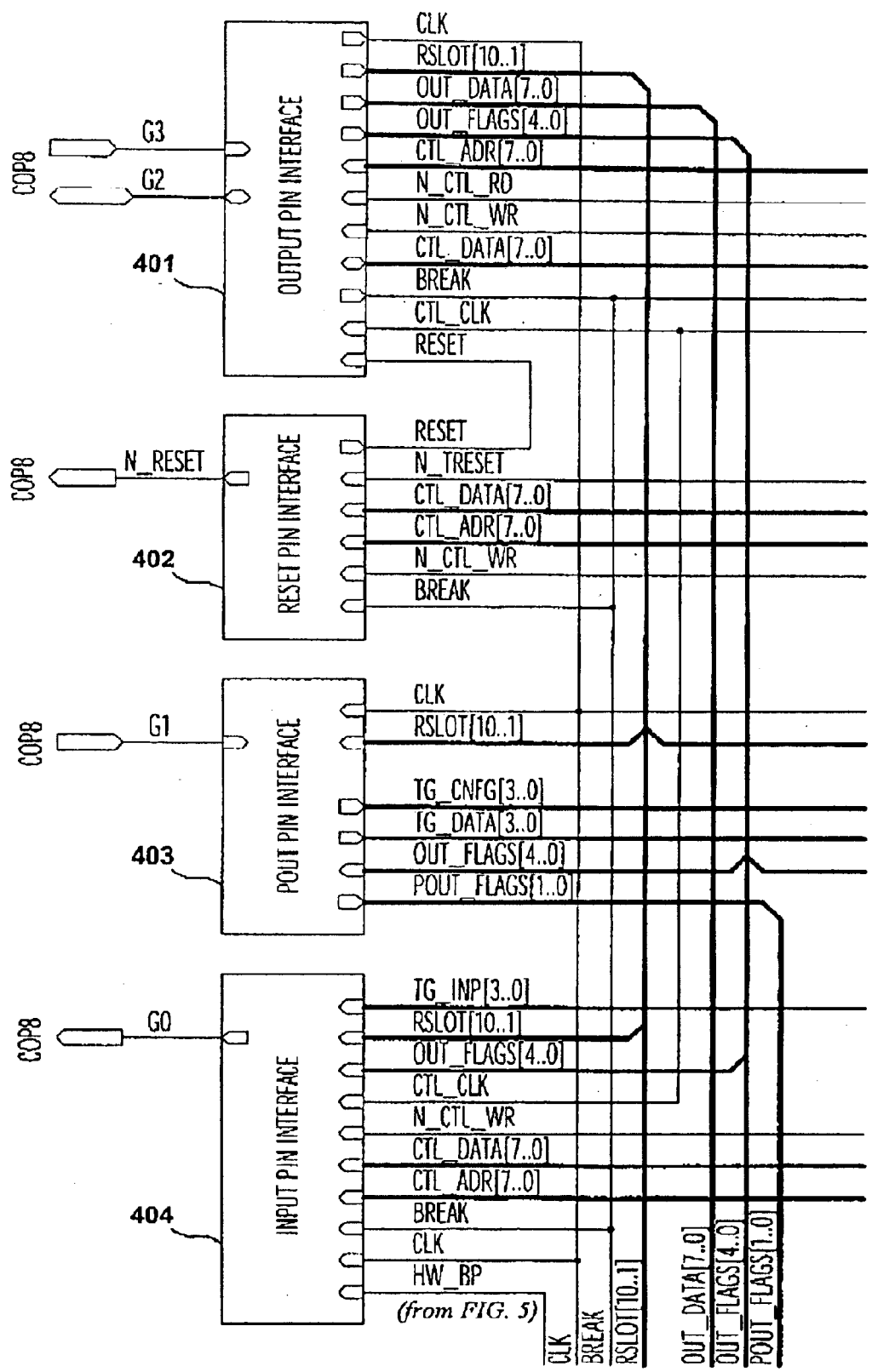
FIG. 4 is a block diagram of the core ICE Logic.
Figure 4B:
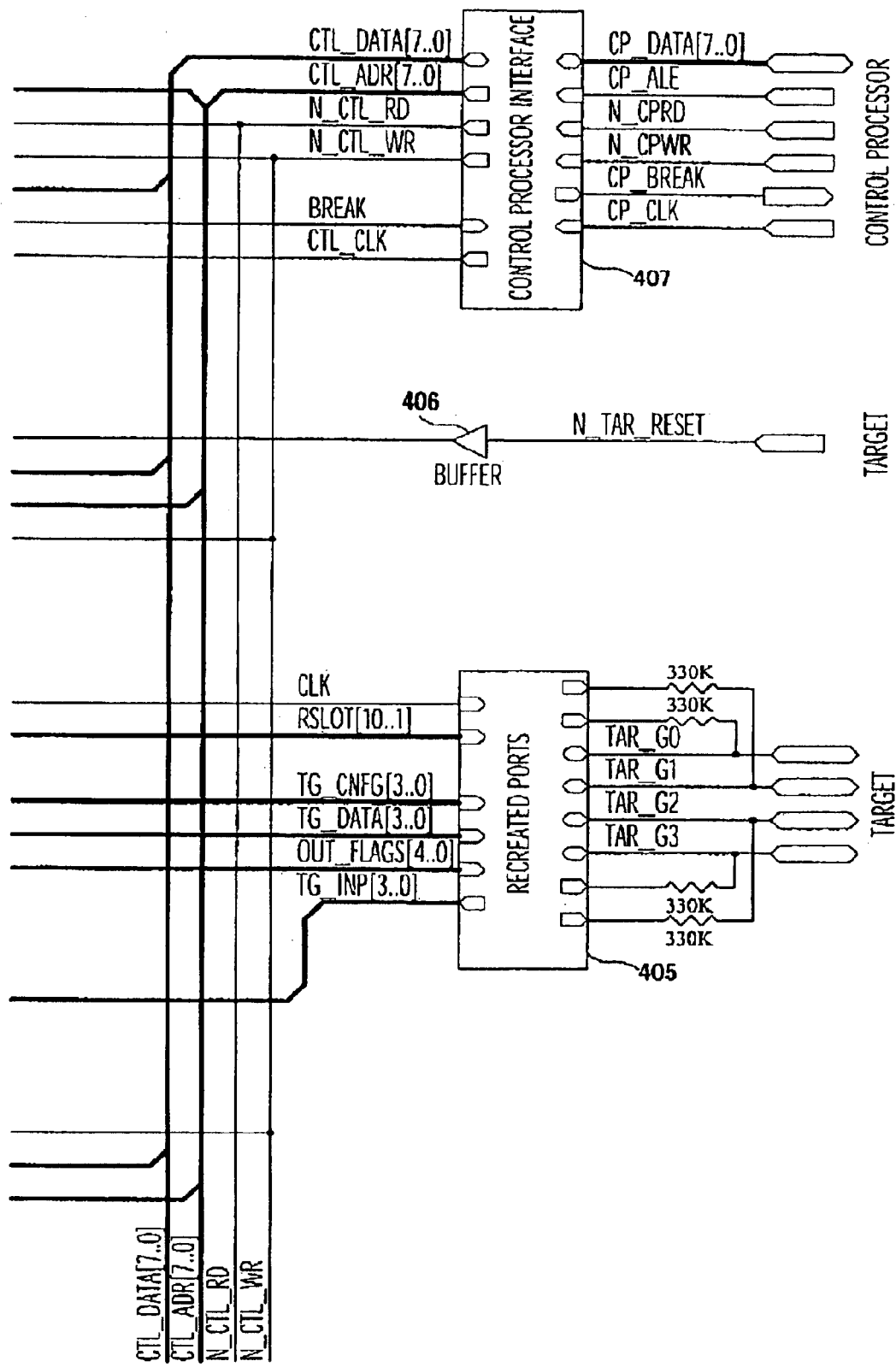
Figure 5A:
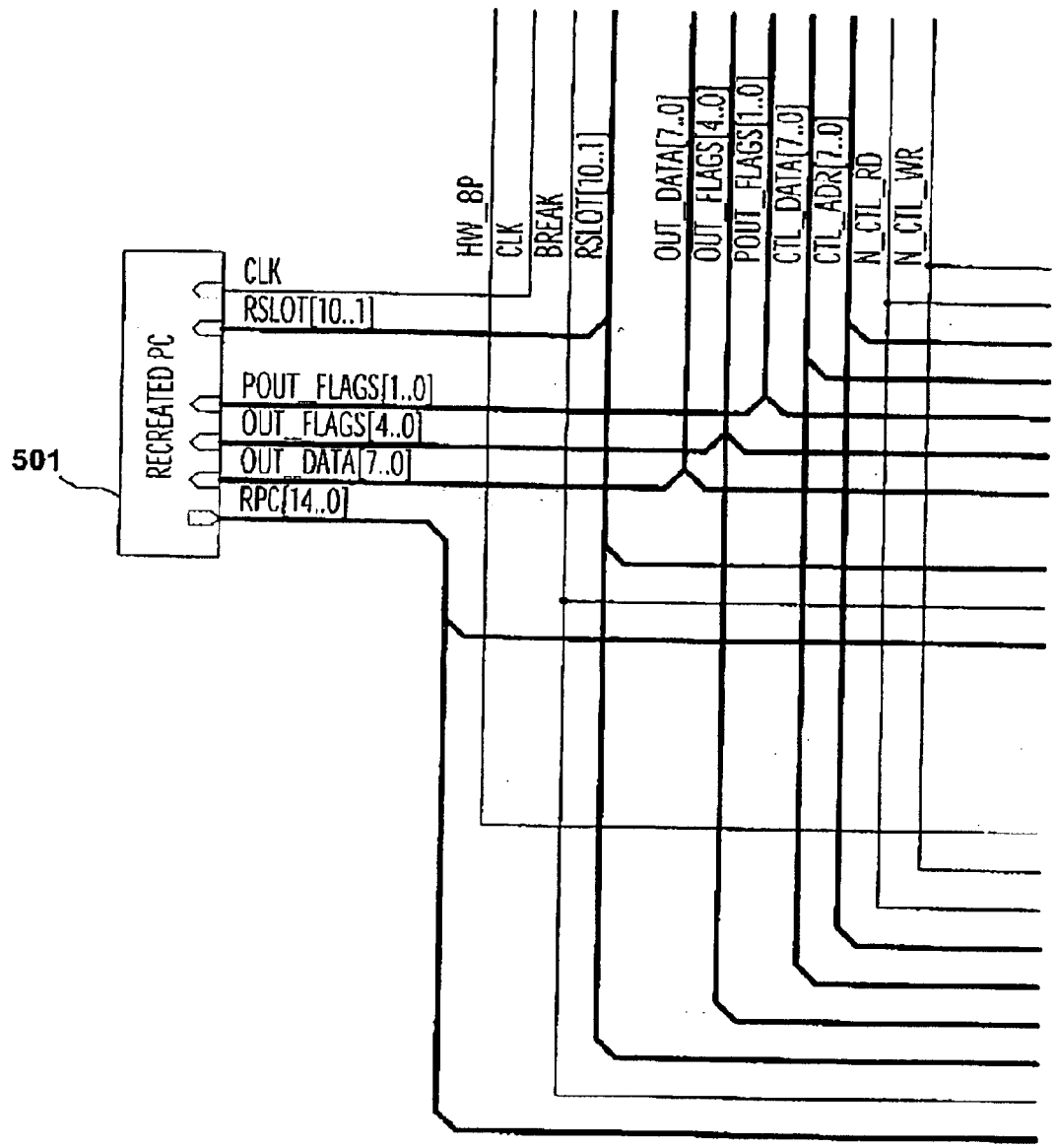
FIG. 5 is a block diagram of the extended features ICE Logic.
Figure 5B:
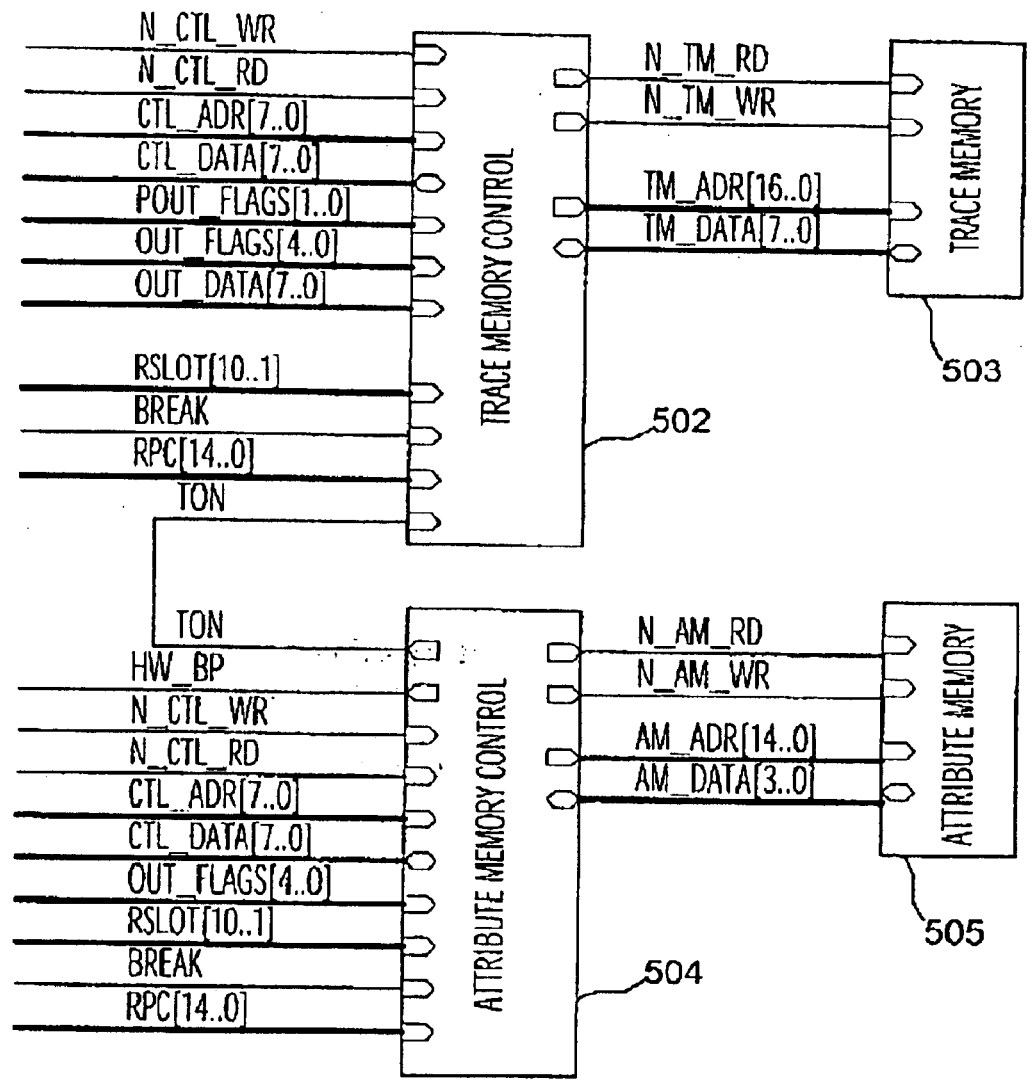

In the following description, numerous specific details are set forth to provide an understanding of the present invention. It will be apparent however, to those skilled in the art and having the benefit of this disclosure, that the present invention may be practiced with apparatus and processes that vary from those specified herein.

Reference herein to "one embodiment", or "an embodiment", means that a particular feature, structure, or characteristic described in connection with the embodiment is included in at least one embodiment of the present invention. The appearance of such phrases herein are not necessarily all referring to the same embodiment. Furthermore, various particular features, structures, or characteristics may be combined in any suitable manner in one or more embodiments.

1.0 COP8 Architecture, Machine Cycle and Timing

The COP8 is an 8-bit accumulator based, Harvard architecture microcontroller with a maximum program memory space of 32 Kbytes. As a microcontroller, all of its program memory and data memory resides on-chip. It has no external bus. The program memory of all COP8 versions used with this invention is implemented as flash memory.

In addition to memory, different versions of the COP8 also have different amounts and types of peripherals on-chip. Some common examples of these on-chip peripherals include timers, digital I/O ports, an interrupt controller and A/D converters.

The COP8 basic machine cycle consists of ten clock periods. Each clock period is referred to as a Slot. So a machine cycle consists of Slot 1 through Slot 10. The instruction set consists of one-byte, two-byte and three-byte instructions. The shortest instructions execute in one machine cycle. The longest instruction executes in seven machine cycles.

The instruction set is composed of arithmetic, logical, memory transfer and transfer of control instructions. The arithmetic and many of the logical instructions use the accumulator as the destination operand. Several of the logical instructions either skip or execute the next instruction depending on the result. There are different transfer of control instructions with a −31/+=byte range, a 2 Kbyte page range or a 32 Kbyte range.

For a more detailed description of the COP8 refer to National Semiconductor's *COP8 Family User's Manual.*

2.0 Modified COP8 Core

In one aspect of the present invention the standard COP8 architecture was modified. First, a small amount of read only memory (ROM) was added beyond the 32 K program memory address space. This ROM contains the in-system programming (ISP) flash memory read/write routines and a monitor (ICE Monitor) program that interfaces to the ICE Logic. This ROM is called the Monitor ROM.

Second, two new instructions were added to the COP8 instruction set. The first instruction is a software breakpoint instruction (assembly code mnemonic: BRK). This instruction pushes the current program counter (PC) onto the stack and jumps to the ICE Monitor. The second instruction is a return to flash instruction (assembly code mnemonic: RETF). This instruction pops the PC from the stack and starts executing in the flash memory (standard program memory address space).

Third, four digital I/O pins were re-configured to interface to the ICE. One of these four pins outputs a clock. This clock is of the same frequency as that used by the COP8 CPU. All information passed on the other three pins is done synchronous to this clock. Two of the remaining three pins are used to output cycle and instruction synchronization flags, state, status, internal data and port recreation information. The last of the four pins is an input pin that is used by the ICE to input control, recreated port, command and write data information.

3.0 Details of the New Instructions

3.1 BRK—Software Breakpoint

The software breakpoint instruction (BRK—opcode 0x62) pushes the return address onto the stack in data memory and then jumps to a fixed address in the Monitor ROM. The execution of this instruction also sets the Break state signal in the modified COP8. The jump to the Monitor ROM and the setting of the Break state only occurs if the modified COP8 is in ICE Hooks mode (see section 6.0, "Details of Enabling the ICE Hooks mode").

During the execution of the BRK instruction, the contents of the PCL (lower 8 bits of the program counter) are transferred to the data memory location referenced by the SP (stack pointer). The SP is then decremented, followed by the contents of PCU (upper 7 bits of the program counter) being transferred to the new data memory location referenced by the SP. The return address is now saved on the stack in data memory RAM. Then the SP is decremented again to set up the stack reference for the next subroutine.

Next, the program counter is loaded with a fixed address that is the entry point into the Monitor ROM. The CPU then starts executing the program in the Monitor ROM at that address.

3.2 RETF—Return from Subroutine to Flash

The return to flash instruction (RETF—opcode 0x63) pops the return address from the stack in data memory and then begins execution at the return address in the flash memory (standard program memory address space). The execution of this instruction also clears the Break state signal in the COP8.

During the execution of the RETF instruction, the SP is first incremented. The lower seven bits of the byte at the data memory location referenced by the SP are then transferred to the PCU, after which the SP is again incremented. Next, the contents of the data memory location referenced by the SP are transferred to the PCL. The return address has now been retrieved from the stack in data memory RAM. The CPU then starts executing the program in the flash memory at the return address.

4.0 Details of the Ice Monitor

In one embodiment of the present invention the ICE Monitor is a program of approximately 512 bytes in length that is physically implemented as a non-programmable Read Only Memory (ROM) logically located outside the standard 32 Kbyte COP8 program memory space. The ICE Monitor program receives and executes commands that are sent to it by the ICE Logic. The ICE Monitor program may be stored in a ROM of any suitable design. Furthermore, the present invention is not limited to the particular type of storage medium in which the ICE Monitor program is stored.

Execution of the ICE Monitor begins when the modified COP8 detects a breakpoint and jumps to the ICE Monitor entry point after pushing the current program counter onto the stack. The first instructions of the ICE Monitor are used to output the A, PSW, B and X registers to the ICE Logic. These registers are used by the ICE Monitor in executing its commands and this initial action preserves their values as used in the user's program context. These values are restored to the registers before the system exits the ICE Monitor and returns to emulating the user's program (see sections 4.1.7 EMULATION RESET COMMAND and 4.1.8 EMULATION GO COMMAND).

After outputting the four registers, the ICE Monitor program, in accordance with one embodiment of the present invention, then enters a loop (idle loop) waiting for a command byte from the ICE Logic. Once a command byte is received, the ICE Monitor decodes the command, executes it and then returns to the idle loop awaiting the next command. Commands are available to read and write the data memory RAM, the special function registers and the flash program memory. In addition, commands are used to return the modified COP8 into emulation mode where it executes the User's program which is stored in flash memory.

4.1 Details of the Ice Monitor Commands

4.1.1 Data Memory Read Command

The DATA MEMORY READ command is used to read byte values from the modified COP8 internal data memory and its special function registers and output the values to the ICE Logic. This command is three bytes long and is of the form:

<01>: <Starting Address> <Count>

The first byte, <01>, is the command value that is decoded by the command decoder.

The <Starting Address> is the address of the first location to be read.

The <Count> is the number of locations to be read.

In executing this command, the ICE Monitor reads the value at the starting address and outputs it to the ICE Logic. It then decrements the Count value. If the decremented Count value is not zero, it increments the Starting Address value, reads the value at the new address, outputs it to the ICE Logic and decrements the Count value again. This continues until the Count value is equal to zero. When the Count value is zero, this routine exits through a common end of command routine and returns to the idle loop to await the next command.

4.1.2 Data Memory Write Command

The DATA MEMORY WRITE command is used to input byte values from the ICE Logic and write the values to the modified COP8 internal data memory and its special function registers. This is a variable length command and is of the form:

<02> <Starting Address> <Count> <Byte 1> <Byte 2> . . . <Byte n>

The first byte, <02>, is the command value that is decoded by the command decoder.

The <Starting Address> is the address of the first location to be written.

The <Count> is the number of bytes remaining to be sent in the command as well as the number of locations to be written.

<Byte 1> <Byte 2> ... <Byte n> are the values to be written.

In executing this command, the ICE Monitor inputs <Byte 1> from the ICE Logic and writes it to the starting address. It then decrements the Count value. If the decremented Count value is not zero, it increments the Starting Address value, inputs the next byte from the ICE Logic, writes this value to the new address and decrements the Count value again. This continues until the Count value is equal to zero. When the Count value is zero, this routine exits through a common end of command routine and returns to the idle loop to await the next command.

4.1.3 Program Memory Read Command

The PROGRAM MEMORY READ command is used to read byte values from the modified COP8 flash program memory and write them to a buffer located in the modified COP8 internal data memory.

This command uses the low-level ISP flash memory read routine. This low-level ISP routine requires the following registers to be set up before it is called:

ISPADHI—High byte of the starting address

ISPADLO—Low byte of the starting address

COUNTHI—High byte of the number of bytes to read

COUNTLO—Low byte of the number of bytes to read

X—Starting address in RAM of the read buffer

The low-level ISP routine reads <COUNTHI><COUNTLO> bytes of the flash memory starting at address <ISPADHI><ISPADLO> and stores the bytes in the modified COP8 internal data memory starting at address <X>.

Before the PROGRAM MEMORY READ command is sent to the ICE Monitor, the ICE Logic loads the appropriate values in the ISPADHI, ISPADLO, COUNTHI and COUNTLO registers using the DATA MEMORY WRITE command.

This command is two bytes long and is of the form:

<03> <Buffer Address>

The first byte, <03>, is the command value that is decoded by the command decoder.

The <Buffer Address> is the starting address of the buffer in the modified COP8 internal data memory where the read flash memory bytes are stored.

In executing this command, the ICE Monitor stores the <Buffer Address> in the X register. It then calls the low-level ISP read routine that is part of the Monitor ROM. The ISP routine reads the number of bytes requested starting at the flash memory address specified and stores them in the internal data memory buffer starting at the address contained in X. When the ISP routine is done reading the flash memory, it returns to this command routine. This routine then exits through a common end of command routine and returns to the idle loop to await the next command.

4.1.4 Program Memory Write Command

The PROGRAM MEMORY WRITE command is used to write byte values to the modified COP8 flash program memory from a buffer located in the modified COP8 internal data memory.

This command uses the low-level ISP flash memory write routine. This low-level ISP routine requires the following registers to be set up before it is called:

ISPADHI—High byte of the starting address

ISPADLO—Low byte of the starting address

COUNT—Number of bytes to write

X—Starting address in RAM of the write buffer

The low-level ISIP routine reads <COUNT> bytes from the buffer in the modified COP8 internal data memory starting at address <X> and writes the bytes into the flash memory starting at address <ISPADHI><ISPADLO>.

Before the PROGRAM MEMORY WRITE command is sent to the ICE Monitor, the ICE Logic loads the appropriate values in the ISPADHI, ISPADLO and COUNT registers using the DATA MEMORY WRITE command.

This command is two bytes long and is of the form:

<04> <Buffer Address>

The first byte, <04>, is the command value that is decoded by the command decoder.

The <Buffer Address> is the starting address of the buffer in the modified COP8 internal data memory where the bytes to be written to the flash memory are stored.

In executing this command, the ICE Monitor stores the <Buffer Address> in the X register. It then calls the low-level ISP write routine that is part of the Monitor ROM. The ISP routine reads the number of bytes requested from the internal data memory buffer starting at the address contained in X and writes them to the flash memory starting at the address specified. When the ISP routine is done writing the flash memory, it returns to this command routine. This routine then exits through a common end of command routine and returns to the idle loop to await the next command.

4.1.5 Program Memory Page Erase Command

The PROGRAM MEMORY PAGE ERASE command is used to erase a page of the flash memory. A page is typically 64 or 128 bytes in size. The flash memory has to be erased before new values can be written to it.

This command uses the low-level ISP flash memory page erase routine. This low-level ISP routine requires the following registers to be set up before it is called:

ISPADHI—High byte of the starting address of the page to be erased

ISPADLO—Low byte of the starting address of the page to be erased

The low-level ISP erases a page of flash memory starting at the <ISPADHI><ISPADLO> page boundary.

Before the PROGRAM MEMORY PAGE ERASE command is sent to the ICE Monitor, the ICE Logic loads the appropriate values in the ISPADHI and ISPADLO registers using the DATA MEMORY WRITE command.

This command is one byte long and is of the form:

<05>

The byte <05> is the command value that is decoded by the command decoder.

In executing this command, the ICE Monitor calls the low-level ISP page erase routine that is part of the Monitor ROM. The ISP routine erases a page of flash memory starting at the specified page boundary. When the ISP routine is done erasing the flash memory, it returns to this command routine. This routine then exits through a common end of command routine and returns to the idle loop to await the next command.

4.1.6 Program Memory Mass Erase Command

The PROGRAM MEMORY MASS ERASE command is used to erase the complete flash memory (up to 32 Kbytes) implemented in the modified COP8. The flash memory has to be erased before new values can be written to it.

This command is one byte long and is of the form:

<06>

The byte <06> is the command value that is decoded by the command decoder.

In executing this command, the ICE Monitor calls the low-level ISP mass erase routine that is part of the Monitor ROM. The ISP routine erases the complete flash memory implemented in the microcontroller. When the ISP routine is done erasing the flash memory, it returns to this command routine. This routine then exits through a common end of command routine and returns to the idle loop to await the next command.

4.1.7 Emulation Reset Command

The EMULATION RESET command is used to start execution of the user's program from a reset.

This command is four bytes long and is of the form:

<07> <X> <B> <A>

The byte <07> is the command value that is decoded by the command decoder.

The <X> is the value for the X register.
The <B> is the value for the B register.
The <A> is the value for the A register.

In executing this command, the ICE Monitor restores the X, B and A registers to the values that were previously set by the user's program. The PSW register is not restored since it is initialized by a Reset. After restoring the last register, this routine stays in a loop waiting for the modified COP8 to be Reset. When the ICE Logic asserts Reset to the microcontroller's RESET pin, the Break state signal is cleared. After Reset is de-asserted, the modified COP8 will start execution at address 0000 of the flash memory (user's program).

This command can be abort before Reset is asserted. If the ICE Monitor receives a byte from the ICE Logic while it is looping, it will fall through the loop and exit through a common end of command routine and return to the idle loop to wait for a new command.

4.1.8 Emulation Go Command

The EMULATION GO command is used to start execution of the user's program at a specific address. The address where execution will begin is on the top of the software stack in the modified COP8 internal data memory.

This command is five bytes long and is of the form:

<08> <X> <B> <PSW> <A>

The byte <08> is the command value that is decoded by the command decoder.

The <X> is the value for the X register.
The <B> is the value for the B register.
The <PSW> is the value for the PSW register.
The <A> is the value for the A register.

Before the EMULATION GO command is sent to the ICE Monitor, the ICE Logic loads the address where the user wants his program to begin executing. This address is placed on the top of the software stack using the DATA MEMORY WRITE command.

In executing this command, the ICE Monitor restores the X, B, PSW and A registers to the values that were previously set by the user's program. This routine then executes a RETF instruction that clears the Break state signal and pops an address off the software stack and loads it into the program counter. Execution of the user's program in flash memory begins at this new value in the program counter.

4.2 Ice Monitor and Ice Logic Synchronization

The COP8 in a user's application can run at any arbitrary frequency up to the maximum permitted by the device specification. The ICE Logic runs at a fixed speed. If the modified COP8 is running at a relatively low frequency, the ICE Logic can input data to the ICE Monitor faster than it can process it. If the modified COP8 is running at its maximum frequency, the ICE Monitor can output data faster than the ICE logic can process it. Because of this wide range of operating conditions, the ICE Monitor and ICE Logic must synchronize the data transfers between them.

Whenever the ICE Monitor is waiting for data from the ICE Logic, it is executing a small loop polling a received byte status flag. In this loop no instructions are skipped. When a byte sent from the ICE Logic has been loaded into the ICE Monitor's receive register, the ICE Monitor detects the received byte status flag is asserted and skips an instruction which causes the modified COP8 to output a Skip Flag on the OUTPUT pin (see Section 5.2). The ICE Logic detects this Skip Flag and knows that the byte was received. Once the ICE Monitor has read the byte from its receiver register, it again skips an instruction. When the ICE Logic detects a second Skip Flag after sending a byte, it knows that the ICE Monitor has consumed the byte and it is safe to send another byte. This Skip Flag synchronization prevents the ICE Logic from overrunning the ICE Monitor's receive register.

Whenever the ICE Monitor is prepared to send data to the ICE Logic, it waits in a loop until it gets a signal from the ICE Logic that it is ready to receive the byte. The ICE Logic signals its readiness by sending a byte to the ICE Monitor. The value of the byte is superfluous. It is the action of sending the byte that gates the ICE Monitor. Upon receiving the byte, the ICE Monitor throws it away, skips an instruction, outputs the pending data to the ICE Logic and skips another instruction. If the ICE Monitor has more data to send, it again loops waiting for the ICE Logic to send the gating byte. When the ICE Logic detects the first Skip Flag in this sequence it knows that the ICE Monitor has seen its signal and is preparing to output its data. Upon detecting the second Skip Flag, the ICE Logic knows that the ICE Monitor has output its pending data and is ready to send another byte. The ICE Logic can then read the transferred byte from its receiver buffer. This gating byte synchronization prevents the ICE Monitor from overrunning the ICE Logic's receive buffer.

5.0 Details of the Reconfigured Digital IO

Four of the modified COP8 digital I/O pins are reconfigured to interface to the ICE Logic. The four pins are the lower four bits of the G Port commonly referred to as G0, G1, G2 and G3. G3 is reconfigured to output the CPU clock. G2 is reconfigured to output synchronizing, state, status and internal data information. G1 is reconfigured to output the program counter update status and the output state of the four G Port pins used in this interface. G0 is reconfigured to input control, target pin data, command and write data information.

5.1 G3—CLK

The G3 (CLK) pin outputs a clock of the same frequency as that used by the modified COP8 CPU. This pin outputs 10 clocks per machine cycle. All information passed on this interface (except external Reset) is done synchronously to this clock. This pin is always clocking except when the modified COP8 is in HALT mode, IDLE mode or the CKI clock has been lost. The signal on this pin is referred to as CLK in the following descriptions.

5.2 G2—OUTPUT

The G2 (OUTPUT) pin outputs synchronizing, state, status and internal data information. There is a significant amount of information that is transferred on this pin to the ICE Logic. The following list summarizes by group the transferred information:

Synchronizing signals:
Machine cycle synchronization (First clock of machine cycle)
Instruction cycle synchronization (Fetch signal, first byte of an instruction)
State signals:
COP8 executing in Break mode (running ICE Monitor)
COP8 executing in Emulation mode (running User program)
Status signals:
Skipped Instruction (current instruction is being skipped)
PL/PU replacement when a program transfer occurs
Internal data signals:
Internal data bus The OUTPUT pin breaks the 10-slot COP8 machine cycle into two fields (see FIG. 6): the Status Field and the Data Field. COP8 internal data is always output in the Data Field. The remaining synchronization, state and status information is encoded in the two slots of the Status Field.

FIG. 6. OUTPUT Pin Field Layout

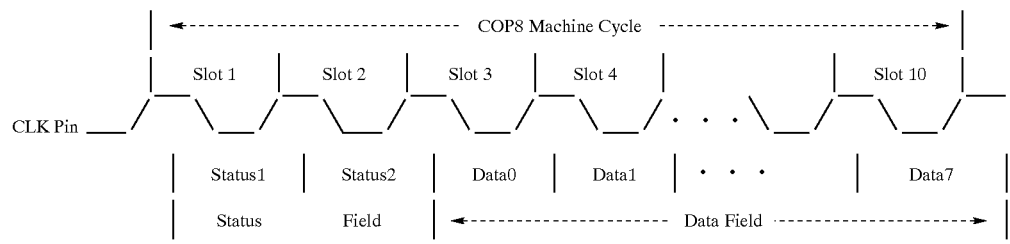

There are four waveform types that are used to encode the information in the Status Field. These waveform types are referred to as Type 1, Type 2, Type 3 and Type 4 waveforms. Type 1 and Type 2 waveforms are bi-phase signals and are only found in the Status Field of the OUTPUT signal. A Type 1 or Type 2 waveform is also called a Sync bit since they are used to synchronize the ICE Logic and COP8 on a machine cycle, instruction cycle and state basis. The four waveforms are defined as follows:

Type 1 waveform—HIGH voltage at negative CLK edge, LOW voltage at positive CLK edge.

Decoded by the ICE Logic as a Sync bit with a '0' logic value.

FIG. 7. Type 1 Waveform

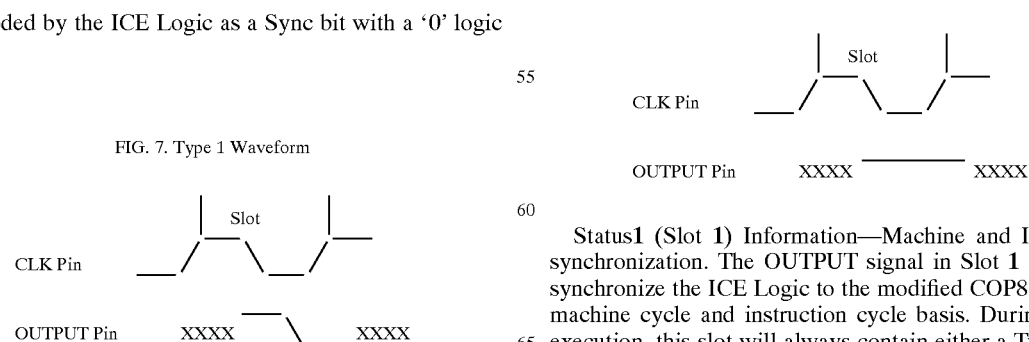

Type 2 waveform—LOW voltage at negative CLK edge, HIGH voltage level at positive CLK edge.

Decoded by the ICE Logic as a Sync bit with a '1' logic value.

FIG. 8. Type 2 Waveform

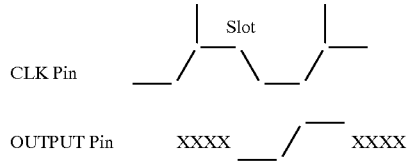

Type 3 waveform—LOW voltage at negative CLK edge, LOW voltage at positive CLK edge.

Decoded by the ICE Logic as a '0' logic value.

FIG. 9. Type 3 Waveform

```
                       |   Slot    |
CLK Pin     ___/‾‾‾\___/‾‾‾

OUTPUT Pin     XXXX _____ XXXX
```

Type 4 waveform—HIGH voltage at negative CLK edge, HIGH voltage level at positive CLK edge.

Decoded by the ICE Logic as a '1' logic value.

FIG. 10. Type 4 Waveform

```
                       |   Slot    |
CLK Pin     ___/‾‾‾\___/‾‾‾

OUTPUT Pin     XXXX ‾‾‾‾‾‾‾‾ XXXX
```

Status1 (Slot 1) Information—Machine and Instruction synchronization. The OUTPUT signal in Slot 1 is used to synchronize the ICE Logic to the modified COP8 on both a machine cycle and instruction cycle basis. During normal execution, this slot will always contain either a Type 1 or a Type 2 waveform. Since there are no Sync bits in the Data Field of the OUTPUT signal, the first slot with a Sync bit following a slot with no Sync bit identifies it as Slot 1 (machine synchronization). The type of Sync bit (Type 1 or Type 2) identifies whether or not this is the first cycle of an instruction (instruction synchronization). A Type 2 waveform signals the first cycle of an instruction and is defined as a Fetch flag.

The ICE Logic also uses the absence of Sync bits to decode internal resets. If there hasn't been a Sync bit in the last 10 CLK periods AND external Reset has been de-asserted, the ICE Logic will decode this as the modified COP8 is resetting internally.

Status2 (Slot 2) Information—State and Status. This slot is used to pass the current state (Break or Emulation), instruction status (skipped or not) and PC replacement status (replace part of the PC or not). The exact meaning of the Status information in this slot depends on the information decoded in Slot 1. See Table I for a complete listing of all Slot 1 and Slot 2 combinations.

The presence or absence of a Sync bit in this slot determines the State information. If a Sync bit is present the modified COP8 is in Break state. If there is no Sync bit, the modified COP8 is in Emulation state.

Decoding Slot 2 logic value information depends on the presence or absence of a Slot 1 Fetch flag. If Slot 1 contains a Fetch flag, the logic value of this slot is used to specify whether or not the current instruction is being skipped. A logic value of '1' (Type 2 or Type 4 waveform) specifies that the current instruction is being skipped.

If Slot 1 does not contain a Fetch flag, the logic value of this slot is used to specify whether or not the lower byte (PL) or the upper 7-bits (PU) of the program counter (PC) had been replaced in the previous cycle. A logic value of '1' specifies a PU/PL replacement. What part of the PC is actually replaced is signaled by the POUT pin (see section 5.3).

A special case of PL/PU replacement is an interrupt. The POUT Pin is also used to signal that an interrupt is being processed.

Data Field (Slots 3 to 10)—Data. The data is shifted out from a COP8 internal data bus using only Type 3 or Type 4 waveforms.

Summary of the OUTPUT Pin (G2)

TABLE I

| | | | | | Valid Slot Waveform Combinations | | | | | |
|---|---|---|---|---|---|---|---|---|---|---|
| Slot 1 | Slot 2 | S3 | S4 | S5 | S6 | S7 | S8 | S9 | S10 | Meaning |
| Type 1 | Type 1 | D0 | D1 | D2 | D3 | D4 | D5 | D6 | D7 | Not a Fetch, Break State D[7 . . . 0] of previous cycle contains internal bus data |
| Type 1 | Type 2 | D0 | D1 | D2 | D3 | D4 | D5 | D6 | D7 | Not a Fetch, Break State D[7 . . . 0] of previous cycle contains PC data |
| Type 1 | Type 3 | D0 | D1 | D2 | D3 | D4 | D5 | D6 | D7 | Not a Fetch, Emulation State D[7 . . . 0] of previous cycle contains internal bus data |
| Type 1 | Type 4 | D0 | D1 | D2 | D3 | D4 | D5 | D6 | D7 | Not a Fetch, Emulation State D[7 . . . 0] of previous cycle contains PC data |
| Type 2 | Type 1 | D0 | D1 | D2 | D3 | D4 | D5 | D6 | D7 | Fetch, Break State D[7 . . . 0] of previous cycle contains internal bus data |
| Type 2 | Type 2 | D0 | D1 | D2 | D3 | D4 | D5 | D6 | D7 | Fetch, Break State, Instruction skipped D[7 . . . 0] of previous cycle contains internal bus data |
| Type 2 | Type 3 | D0 | D1 | D2 | D3 | D4 | D5 | D6 | D7 | Fetch, Emulation State D[7 . . . 0] of previous cycle contains internal bus data |
| Type 2 | Type 4 | D0 | D1 | D2 | D3 | D4 | D5 | D6 | D7 | Fetch, Emulation State, Instruction skipped D[7 . . . 0] of previous cycle contains internal bus data |
| Type 3 | Type 3 | — | — | — | — | — | — | — | — | Reset, Emulation State D[7 . . . 0] contains no valid data |
| Type 4 | Type 3 | — | — | — | — | — | — | — | — | Reset, Emulation State D[7 . . . 0] contains no valid data |

5.3 G1—POUT

The G1 (POUT) pin outputs instruction source, PC update activity and the data that allows the ICE Logic to recreate the output state of the four G Port digital I/O pins used in this interface. This pin uses only Type 3 and Type 4 waveforms.

The POUT pin breaks the 10-slot COP8 machine cycle into three fields (see FIG. 11): the PC Status Field, the Configuration Register Field and the Data Register Field.

The interrupt activity and PC activity information is used in combination with the Fetch Flag and PC replacement status of the OUTPUT pin. From this data, the ICE Logic recreates the PC as it executes the User's program. This recreated PC can be stored in a Trace Memory in the ICE Logic to provide the User with a snapshot of his program's execution history.

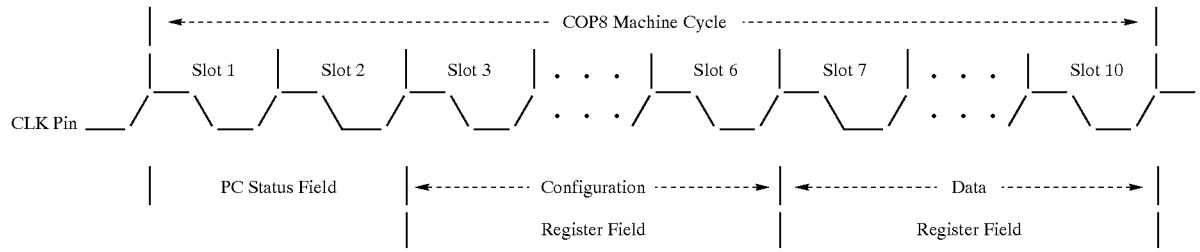

FIG. 11. POUT Pin Field Layout

The Configuration Register Field and the Data Register Field are used by the ICE Logic to recreate the output functionality of G0, G1, G2 and G3. For each G Port pin that is recreated the modified COP8 outputs one Configuration Register bit and one Data Register bit. These two bits allow the ICE Logic to support the various types of output configurations available on the modified COP8 (see Table II). When a pin is configured for simple I/O, the modified COP8 simply outputs an image of its internal Configuration and Data Register bits. For pins that are configured to use an Alternate Function, the modified COP8 outputs the appropriate Configuration and Data Register bit pattern to reflect the output value of the function.

TABLE II

COP8 Output Port Driver Configurations

| Configuration Register Bit | Data Register Bit | Output Driver Configuration |
|---|---|---|
| 0 | 0 | Tri-state output |
| 0 | 1 | Wear pull-up |
| 1 | 0 | Push-pull zero output |
| 1 | 1 | Push-pull one output |

In Slot 3 through Slot 6, the POUT pin shifts out the Configuration Register bits least significant bit (LSB) first. In Slot 7 through Slot 10, the Data Register bits are shifted out LSB first. The ICE Logic shifts in this POUT data and at the end of Slot 10 synchronously outputs the new output state to its recreated output pins, which are connected to the User's target system.

The PC Status field is used to provide the ICE Logic with information on the source of instructions (Flash or Monitor ROM), interrupt activity and PC activity. When the Fetch Flag is asserted on the OUTPUT pin, the logic value on the POUT pin during Slot 1 determines the source of the instruction. A logic value of '0' specifies that the instruction is being fetched from the Flash Memory. A logic value of '1' specifies an instruction fetch from the Monitor ROM.

TABLE III

| OUTPUT Pin Signals | | POUT Pin Signals PC Status Field | | PC Activity |
|---|---|---|---|---|
| FETCH FLAG | PL/PU REPLACEMENT | SLOT 1 | SLOT 2 | PC ACTION |
| 0 | 0 | 0 | 0 | No Action - PC Frozen |
| 0 | 0 | 1 | 0 | PC Incremented |
| 0 | 1 | 0 | 0 | PCL Replaced |
| 0 | 1 | 0 | 1 | Full 7 bits of PCH Replaced |
| 0 | 1 | 1 | 1 | Lower 4 bits of PCH Replaced |
| 1 | N.A. | X | 0 | PC Incremented |
| 1 | N.A. | X | 1 | Interrupt |

N.A. - Not Applicable
X - Don't care

As shown in Table III, during non-fetch cycles (Fetch Flag=0) the PC can stay the same, increment or have various parts replaced. These actions represent the complete set of all the possible PC actions available to the COP8 instruction set. This allows the ICE Logic to faithfully recreate the PC and track the instruction flow accurately. During a fetch cycle the PC is either incremented or an interrupt is being processed. If the ICE Logic decodes an interrupt, it forces the interrupt vector 0x00FF into its recreated PC to mimic the actions of the modified COP8.

Summary of the POUT Pin (G1)

TABLE IV

Valid Slot 1 and Slot 2 Waveform Combinations

| S1 | S2 | S3 | S4 | S5 | S6 | S7 | S8 | S9 | S10 | Meaning |
|----|----|----|----|----|----|----|----|----|-----|---------|
| 0 | 0 | GC0 | GC1 | GC2 | GC3 | GD0 | GD1 | GD2 | GD3 | Fetch — Fetch from Flash |
|   |   |     |     |     |     |     |     |     |     | Not Fetch — PC frozen last cycle |
| 0 | 1 | GC0 | GC1 | GC2 | GC3 | GD0 | GD1 | GD2 | GD3 | Fetch — Fetch from Flash, Interrupt |
|   |   |     |     |     |     |     |     |     |     | Not Fetch — Full PCU replaced last cycle |
| 1 | 0 | GC0 | GC1 | GC2 | GC3 | GD0 | GD1 | GD2 | GD3 | Fetch — Fetch from ICE Monitor |
|   |   |     |     |     |     |     |     |     |     | Not Fetch — PC incremented last cycle |
| 1 | 1 | GC0 | GC1 | GC2 | GC3 | GD0 | GD1 | GD2 | GD3 | Fetch — Fetch from ICE Monitor, Interrupt |
|   |   |     |     |     |     |     |     |     |     | Not Fetch — 4 LSBs of PCU replaced last cycle |

5.4 G0—INPUT

The G0 (INPUT) pin inputs control, command, write data and the target pin data that allows the modified COP8 to recreate the input state of the four G Port digital I/O pins used in this interface. This pin uses only Type 3 and Type 4 waveforms.

The INPUT pin breaks the 10-slot COP8 machine cycle into two fields (see FIG. 12): the Command Field and the Input Data Field.

is used by the ICE Logic to input commands and data to the ICE Monitor. It is asserted when Slot 10 contains a logic '0' and Slot 1 contains a logic '1'.

The Hardware Break command is used to force the execution of a Software Breakpoint instruction (BRK). This command is asserted when both Slot 10 and Slot 1 contain a logic '0'. When the modified COP8 decodes a Hardware Break command, it finishes execution of the current instruction (and skips the next, if it would normally have been

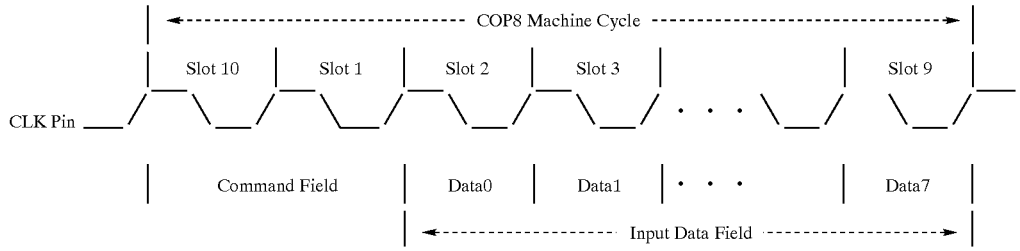

FIG. 12. INPUT Pin Field Layout

The Command Field can contain three different commands and the Input Data Field can contain two different types of data (see Table V). The Input Data Field can contain either 8-bits of ICE Monitor data or 4-bits of Target pin data. ICE Monitor data is used when the ICE Logic is inputting to the ICE Monitor a command to decode or the data required by a previously sent ICE Monitor command. As the 66X20 ICE Monitor data is input to the modified COP8, it is shifted into the ICE Monitor's receive buffer (ICEDATA register). After all eight bits are shifted in, a received byte status flag is asserted that is readable by the ICE Monitor.

The Target pin data is used to allow the modified COP8 to recreate the input functionality of the four G port pins used in this interface. The ICE Logic samples its recreated G[0..3] port pins that are connected to the User's target at the end of Slot 1. When Input Data Field contains the Target pin data, the ICE Logic shifts in G0 during Slot 2, G1 during Slot 3, G2 during Slot 4 and G3 during Slot 5. The modified COP8 uses these shifted in values in place of the pins' normal input buffer values. Slot 6 through Slot 9 are 'don't cares' and are ignored by the modified COP8.

The three commands available in the Command Field are the Hardware Break command, the Monitor Data command and the Recreated Port Input command. The Recreated Port Input command is the default command and is asserted when Slot 10 contains a logic '1' and Slot 1 contains a logic '0'. The Monitor Data command is used only in Break state. It skipped), pushes the PC on the stack and then vectors to the ICE Monitor. When the Command Field contains a Hardware Break command, the Input Data Field always contains Port Input data.

The Hardware Break command is disabled if the modified COP8 is already in the Break state. However, if the modified COP8 is in the Break state and the Hardware Break command is asserted and remains asserted as the ICE Monitor executes the Return to Flash instruction (RETF), the modified COP8 will execute one instruction and then vector back to the ICE Monitor.

The INPUT pin can also be used to force the execution of a Software Breakpoint instruction even if the modified COP8 is in either Idle or Halt mode (Power Saving modes). When the modified COP8 is in one of its Power Saving modes, the CLK pin is not toggling. As a result, the Hardware Break command cannot be input. In order to force the modified COP8 to exit from the Power Saving mode and execute a Software Breakpoint instruction, the ICE Logic drives the INPUT pin to a logic '0', then to a logic '1' and then to a logic '0' again. The '0' to '1' transition followed by a '1' to '0' transition causes the modified COP8 to exit the Power Saving mode, push the PC on the stack and then vector to the ICE Monitor.

Summary of the INPUT Pin (G0)

TABLE V

| | | | | Valid Slot Waveform Combinations | | | | | | |
|---|---|---|---|---|---|---|---|---|---|---|
| S10 | S1 | S2 | S3 | S4 | S5 | S6 | S7 | S8 | S9 | Meaning |
| 0 | 0 | TG0 | TG1 | TG2 | TG3 | — | — | — | — | Hardware Break Request Recreated Port Input data from Target |
| 0 | 1 | D0 | D1 | D2 | D3 | D4 | D5 | D6 | D7 | Monitor Data Command D[7 . . . 0] load into ICEDATA register |
| 1 | 0 | TG0 | TG1 | TG2 | TG3 | — | — | — | — | Recreated Port Input Recreated Port Input data from Target |
| 1 | 1 | — | — | — | — | — | — | — | — | Data Invalid |

6.0 Details of Enabling the Ice Hooks Mode

The ICE Hooks mode described in this patent is enabled in the modified COP8 by inputting a specific bit pattern (key) on the modified COP8's G0 pin during the initial assertion of external Reset.

When external Reset is asserted the modified COP8's G0 and G2 Port pins are configured with a weak pull-up. With external Reset still asserted, the ICE Logic outputs a clock on OUTPUT (G2). The ICE Logic then synchronously outputs the key on INPUT (G0). The ICE Logic keeps external Reset asserted and continually inputs the key until it detects transitions on the CLK (G3) pin, which it decodes as CLK being active and the modified COP8 in ICE Hooks mode. The ICE Logic then tri-states the clock it is outputting on OUTPUT, disables the key output on INPUT and de-asserts external Reset.

In order to minimize the chance of an accidental enabling of ICE Hooks mode in a non-development environment the length of the key should be fairly long (>16 bits). An example of an implementation that uses a 24-bit key would be the following pattern: 0x47CF09. The modified COP8 does not start shifting in the key until its internal initialization is complete.

Once ICE Hooks is enabled, the only way to exit from the mode is to completely remove power from the modified COP8.

7.0 Details of the Mechanical Connection to the Emulator

The physical connection between the modified COP8 and the ICE Logic is accomplished with a standard 2×7 header. To use the emulator with the modified COP8 soldered on the target system PCB, the User would design his PCB with a 2×7-header pattern located next to the G Port of the modified COP8. The connections to this pattern are shown below in FIG. 13:

FIG. 13: Signal layout on ICE Logic connector

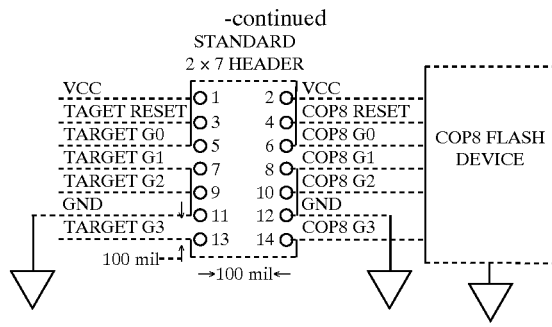

The preferred implementation of the connector uses a 2×7 header with 100 mil (0.1") spacing between all pins. Each pin is a 25 mil square pin with a 230 mil insertion length. Standard headers manufactured by 3M (part number: 2380-5121TN) or Molex (part number: 10-88-1801) are acceptable.

When the User is using the emulator during development, a mating connector from the emulator is placed on the header. The signals from the modified COP8 are connected to the ICE Logic through one side of the header. The ICE Logic's recreated ports and target reset signal are connected to the User's system through the other side of the header.

When the User wants to test his system without the emulator, he can simply short the pins across the header using standard shorting blocks. This connects the target system logic directly to the pins of the modified COP8. For production, the header need not be inserted and the PCB can then be assembled with shorting wires connecting adjacent holes (1 to 2, 3 to 4, etc.) in the header pattern.

An alternative that simplifies production would be to lay out the PCB with traces connecting adjacent holes. During development, the engineer would cut the traces before inserting the 2×7 header. In production, with the adjacent holes already shorted, no further assembly work on the header is required.

8.0 Details of the Core Ice Logic 8.1 Output Pin and Clock Pin (Block 401) Logic Equations and Explanation 8.1.1 COP8 Interface 401-1    CLK = G3;
401-2    OUTPUT = G2;

-continued

| | |
|---|---|
| 401-3 | G2 = CTL_CLK; |
| 401-4 | G2.oe = .NOT. (STOP_CODE); |

8.1.2 Machine Cycle Synchronization and Timing

| | |
|---|---|
| 401-5 | LEVEL_AT_NEG_CLK_EDGE.d = OUTPUT; |
| 401-6 | LEVEL_AT_NEG_CLK_EDGE.clk = .NOT. (CLK); |
| 401-7 | NOT_A_SYNC_BIT.d = .NOT. (LEVEL_AT_NEQ_CLK_EDGE .XOR. OUTPUT); |
| 401-8 | NOT_A_SYNC_BIT.clk = CLK; |
| 401-9 | RSLOT2.d = NOT_A_SYNC_BIT .AND. (LEVEL_AT_NEG_CLK_EDGE .XOR. OUTPUT); |
| 401-10 | RSLOT2.clk = CLK; |
| 401-11 | RSLOT2.clr = RESET; |
| 401-12 | RSLOT3.d = RSLOT2; |
| 401-13 | RSLOT3.clk = CLK; |
| 401-14 | RSLOT3.clr = RESET; |
| 401-15 | RSLOT4.d = RSLOT3; |
| 401-16 | RSLOT4.clk = CLK; |
| 401-17 | RSLOT4.clr = RESET; |
| 401-18 | RSLOT5.d = RSLOT4; |
| 401-19 | RSLOT5.clk = CLK; |
| 401-20 | RSLOT5.clr = RESET; |
| 401-21 | RSLOT6.d = RSLOT5; |
| 401-22 | RSLOT6.clk = CLK; |
| 401-23 | RSLOT6.clr = RESET; |
| 401-24 | RSLOT7.d = RSLOT6; |
| 401-25 | RSLOT7.clk = CLK; |
| 401-26 | RSLOT7.clr = RESET; |
| 401-27 | RSLOT8.d = RSLOT7; |
| 401-28 | RSLOT8.clk = CLK; |
| 401-29 | RSLOT9.clr = RESET; |
| 401-30 | RSLOT9.d = RSLOT8; |
| 401-31 | RSLOT9.clk = CLK; |
| 401-32 | RSLOT9.clr = RESET; |
| 401-33 | RSLOT10.d = RSLOT9; |
| 401-34 | RSLOT10.clk = CLK; |
| 401-35 | RSLOT10.clr = RESET; |
| 401-36 | RSLOT1.set = RESET; |
| 401-37 | RSLOT1.d = RSLOT10 # RSLOT1; |
| 401-38 | RSLOT1.clk = CLK; |
| 401-39 | RSLOT1.clr = RSLOT2; |

8.1.3 Output Pin Flag Decodes

| | |
|---|---|
| 401-40 | FETCH.d = LEVEL_AT_NEG_CLK_EDGE .XOR. OUTPUT; |
| 401-41 | FETCH.clk = CLK; |
| 401-42 | FETCH.ena = RSLOT1; |
| 401-43 | FETCH.clr = RSLOT10; |
| 401-44 | SKIP.d = FETCH .AND. OUTPUT; |
| 401-45 | SKIP.clk = CLK; |
| 401-46 | SKIP.ena = RSLOT2; |
| 401-47 | SKIP.clr = RESET_ACTIVE; |
| 401-48 | PC_REPLACE.d = .NOT. (FETCH) .AND. OUTPUT; |
| 401-49 | PC_REPLACE.clk = CLK; |
| 401-50 | PC_REPLACE.ena = RSLOT2; |
| 401-51 | PC_REPLACE.clr = RESET_ACTIVE; |
| 401-52 | RESET_ACTIVE.set = RESET; |
| 401-53 | RESET_ACTIVE.d = .NOT. (LEVEL_AT_NEG_CLK_EDGE .XOR. OUTPUT); |
| 401-54 | RESET_ACTIVE.clk = CLK; |
| 401-55 | RESET_ACTIVE.ena = RSLOT1; |
| 401-56 | RESET_ACTIVE.clr = RSLOT2; |
| 401-57 | OUT_FLAGS0 = FETCH; |
| 401-58 | OUT_FLAGS1 = SKIP; |
| 401-59 | OUT_FLAGS2 = PC_REPLACE; |
| 401-60 | OUT_FLAGS3 = RESET_ACTIVE; |
| 401-61 | OUT_FLAGS4 = STOP_CODE; |
| 401-62 | BREAK.d = LEVEL_AT_NEG_CLK_EDGE .XOR. OUTPUT; |
| 401-63 | BREAK.clk = CLK; |
| 401-64 | BREAK.ena = RSLOT2; |
| 401-65 | BREAK.clr = RESET_ACTIVE; |

8.1.4 Output Pin Data Register

| | |
|---|---|
| 401-66 | OUT_DATA7.d = OUTPUT; |
| 401-67 | OUT_DATA7.clk = CLK; |
| 401-68 | OUT_DATA7.ena = .NOT(RSLOT1 .OR. RSLOT2); |
| 401-69 | OUT_DATA6.d = OUT_DATA7; |
| 401-70 | OUT_DATA6.clk = CLK; |
| 401-71 | OUT_DATA6.ena = .NOT(RSLOT1 .OR. RSLOT2); |
| 401-72 | OUT_DATA5.d = OUT_DATA6; |
| 401-73 | OUT_DATA5.clk = CLK; |
| 401-74 | OUT_DATA5.ena = .NOT(RSLOT1 .OR. RSLOT2); |
| 401-75 | OUT_DATA4.d = OUT_DATA5; |
| 401-76 | OUT_DATA4.clk = CLK; |
| 401-77 | OUT_DATA4.ena = .NOT(RSLOT1 .OR. RSLOT2); |
| 401-78 | OUT_DATA3.d = OUT_DATA4; |
| 401-79 | OUT_DATA3.clk = CLK; |
| 401-80 | OUT_DATA3.ena = .NOT(RSLOT1 .OR. RSLOT2); |
| 401-81 | OUT_DATA2.d = OUT_DATA3; |
| 401-82 | OUT_DATA2.clk = CLK; |
| 401-83 | OUT_DATA2.ena = .NOT(RSLOT1 .OR. RSLOT2); |
| 401-84 | OUT_DATA1.d = OUT_DATA2; |
| 401-85 | OUT_DATA1.clk = CLK; |
| 401-86 | OUT_DATA1.ena = .NOT(RSLOT1 .OR. RSLOT2); |
| 401-87 | OUT_DATA0.d = OUT_DATA1; |
| 401-88 | OUT_DATA0.clk = CLK; |
| 401-89 | OUT_DATA0.ena = .NOT(RSLOT1 .OR. RSLOT2); |

8.1.5 Mode Enabling Logic

| | |
|---|---|
| 401-90 | ENABLE_CLEAR.d = CTL_DATA7; |
| 401-91 | ENABLE_CLEAR.clk = N_CTL_WR; |
| 401-92 | ENABLE_CLEAR.ena = (CTL_ADR[7 . . . 0] == 0x00); |
| 401-93 | CLK_DETECT[2 . . . 0].d = CLK_DETECT[2 . . . 0] + 1; |
| 401-94 | CLK_DETECT[2 . . . 0].clk = CLK; |
| 401-95 | CLK_DETECT[2 . . . 0].clr = ENABLE_CLEAR; |
| 401-96 | STOP_CODE.d = VCC; |
| 401-97 | STOP_CODE.clk = .NOT.(CLK_DETECT2); |
| 401-98 | STOP_CODE.clr = ENABLE_CLEAR; |

8.1.6 Control Processor Read Buffer Logic

| | |
|---|---|
| 401-99 | FIRST_SKIP.d = VCC; |
| 401-100 | FIRST_SKIP.clk = SKIP; |
| 401-101 | FIRST_SKIP.clr = CLR_FLAGS; |
| 401-102 | SECOND_SKIP.d = FIRST_SKIP; |
| 401-103 | SECOND_SKIP.clk = SKIP; |
| 401-104 | SECOND_SKIP.clr = CLR_FLAGS; |
| 401-105 | CLR_FLAGS.d = CTL_DATA0; |
| 401-106 | CLR_FLAGS.clk = N_CTL_WR; |
| 401-107 | CLR_FLAGS.ena = (CTL_ADR[7 . . . 0] == 0x00); |
| 401-108 | READ_BUFFER[7 . . . 0].d = OUT_DATA[7 . . . 0]; |
| 401-109 | READ_BUFFER[7 . . . 0].clk = CLK; |
| 401-110 | READ_BUFFER[7 . . . 0].ena = (READ_CNTR[2 . . . 0] == 0x2) .AND. RSLOT1; |
| 401-111 | READ_CNTR[2 . . . 0].d = READ_CNTR[2 . . . 0] + 1; |
| 401-112 | READ_CNTR[2 . . . 0].clk = CLK; |
| 401-113 | READ_CNTR[2 . . . 0].ena = FIRST_SKIP .AND. .NOT. (READ_CNTR2) .AND. RSLOT10; |
| 401-114 | READ_CNTR[2 . . . 0].clr = .NOT. (FIRST_SKIP); |
| 401-115 | CTL_DATA[7 . . . 0] = READ_BUFFER[7 . . . 0]; |
| 401-116 | CTL_DATA[7 . . . 0].oe = (CTL_ADR[7 . . . 0] == 0x05) .AND. .NOT. (N_CTL_RD) |
| 401-117 | CTL_DATA0 = SECOND_SKIP; |

-continued 401-118 CTL_DATA.oe = (CTL_ADR[7 ... 0] == 0x06)
.AND. .NOT. (N_CLT_RD];

8.1.7 Explanation of Logic Equations

There is a tremendous about of decoding that the ICE Logic must do with the OUTPUT and POUT signals. This decoding is completely dependent on the ICE Logic running synchronously with the modified COP8. Synchronization is accomplish by the sync bits of the OUTPUT signal that allows the ICE Logic to identify Slot 1 of the modified COP8's machine cycle every machine cycle. The whole sequence of events starts with the ICE Logic determining if the current slot contains a sync bit or not. Note: The Slots in the ICE Logic are referred to as Recreated Slots, or RSLOT.

To decode if the current slot has a sync bit, the logic levels of the OUTPUT pin on both edges of CLK have to be examined. If they are different, the slot contains a sync bit. First, the logic level at the negative clock edge is captured in a D-flop (lines 401-5 and 401-6). If the logic level at the positive clock edge is the same, the slot does not contain a sync bit and this is captured in a D-flop (lines 401-7 and 401-8). The sync bit that defines Slot 1 is decoded at the end of Slot 1 and is used to start the timing chain beginning with Slot 2 (RSLOT2, lines 401-9 to 401-11). Once Slot 2 has been asserted, the timing chain continues through Slot 3 to Slot 10 and then Slot 1 (RSLOT3 to RSLOT10, RSLOT1; lines 401-12 to 401-39). The timing chain will stay in Slot 1 until another sync bit is detected and Slot 2 is asserted.

The FETCH flag (lines 401-40 to 401-43) is decoded every cycle based on a sync bit in Slot 1. The SKIP flag (lines 401-44 to 401-47) is decoded every time FETCH is asserted and there is a '1' logic level on the OUTPUT pin during Slot 2. The PC_REPLACE flag (lines 401-48 to lines 401-51) is decode every non-FECTH cycle when there is a '1' logic level on the OUTPUT pin during Slot 2. The RESET_ACTIVE flag (lines 401-52 to 401-56) is asserted whenever RESET is asserted on the modified COP8's N_RESET pin (lines 402-1 to 402-3 and 402-14) or whenever the timing chain is in Slot 1 and the modified COP8 doesn't output a sync bit. These flags are grouped together with the STOP_CODE flag (see below) as the bus OUT_FLAGS[4..0] (lines 401-57 to 401-61) and are available to the other blocks of the ICE Logic. The BREAK flag (lines 401-62 to 401-65) is decoded every cycle based on a sync bit in Slot 2.

The data that is available on the OUTPUT pin is captured every cycle using an eight stage shift register (lines 401-66 to 401-89). The LSB of the data is initially captured in OUT_DATA7 during Slot 3. During the next seven Slots, the next least significant bits are captured in OUT_DATA7 while the previously captured bits are shifted through the register. At the end of Slot 10 data bit 0 is in OUT_DATA0, data bit 1 in OUT_DATA1, etc. This data is held in the OUT_DATA register during Slot 1 and Slot 2 and beginning in Slot 3 the capture cycle is repeated.

Inputting the Enabling Code into the modified COP8 to put it into ICE Hooks mode is under the control of the Control Processor. The Enabling Code is input to the modified COP8 whenever the signal STOP_CODE (lines 401-96 to 401-98) is de-asserted. With STOP_CODE de-asserted, the G2 signal from the modified COP8, which is normally an input, is enabled as an output (lines 401-3 and 401-4) to allow outputting of the enabling clock. Before starting the ICE Logic to input the Enabling Code the Control Processor first writes a '1' to the ENABLE_CLEAR (lines 401-90 to 401-92) register to clear (de-assert) STOP_CODE and the ICE Hooks detection logic. The Control Processor then writes a '0' to the ENABLE_CLEAR register to allow the detection of the modified COP8 in ICE Hooks mode. The ICE Logic detects that the modified COP8 is in ICE Hooks mode by the presence of a clock signal on the G3 signal. This clock signal is detected by using it to clock a 3-bit counter CLK_DETECT[2..0] (lines 401-93 to 401-95). When this counter overflows, it causes STOP_CODE to be asserted which disables the inputting of the Enabling Code to the modified COP8.

When the Control Processor is waiting to receive a byte of data from the ICE Monitor, it uses a sequence of two Skip flags to detect that the data is available in the ICE Logic to read (see Section 4.2). The sequence of two Skip flags is detected by the FIRST SKIP (lines 410-99 to 401-1 01) and the SECOND_SKIP (lines 401-102 to 401-104) flops. When the Control Processor is expecting a byte, it will first clear these flops by writing a '1' to the CLR_FLAGS register (lines 401-105 to 401-107) and then writing a '0' to it. The Control Processor will then poll the SECOND_SKIP flop by reading address 0x06, waiting for the status bit to become asserted. When the SECOND_SKIP flop is asserted, the Control Processor knows that the ICE Monitor has output the data and it has been captured in the READ_BUFFER (lines 401-108 to 401-114). The Control Processor then reads the READ_BUFFER by reading address 0x05 (lines 401-115 and 401-116).

8.2 Reset Pin (Block 402) Logic Equations and Explanation

8.2.1 COP8 Interface

| | |
|---|---|
| 402-1 | N_RESET = .NOT. ( RESET_COP8 |
| 402-2 | .OR. .NOT. (BREAK) .AND. .NOT. (DISABLE_TAR_RST) .AND. .NOT. (N_TRESET) |
| 402-3 | .OR. START_EM_TRST .AND. .NOT.(N_TRESET) ); |

8.2.2 Control Processor Interface

| | |
|---|---|
| 402-4 | RESET_COP8.d = CTL_DATA3; |
| 402-5 | RESET_COP8.clk = N_CTL_WR; |
| 402-6 | RESET_COP8.ena = (CTL_ADR[7 ... 0] == 0x00); |
| 402-7 | DISABLE_TAR_RST.d = CTL_DATA4; |
| 402-8 | DISABLE_TAR_RST.clk = N_CTL_WR; |
| 402-9 | DISABLE_TAR_RST.ena = (CTL_ADR[7 ... 0]== 0x00); |
| 402-10 | START_EM_TRST.d = CTL_DATA5; |
| 402-11 | START_EM_TRST.clk = N_CTL_WR; |
| 402-12 | START_EN_TRST.ena = (CTL_ADR[7 ... 0] == 0x00); |
| 402-13 | START_EM_TRST.clr = .NOT. (BREAK); |

8.2.3 Emulator Core Interface

| | |
|---|---|
| 402-14 | RESET = .NOT. (N_RESET); |

8.2.4 Target Interface (Block 406)

| | |
|---|---|
| 402-15 | N_TRESET = N_TAR_RESET; |

8.2.5 Explanation of Logig Equations

N_RESET (lines 402-1 to 402-3) can be asserted at any time by the Control Processor or it can be asserted as a result of a Reset assertion on the User's Target system (line

402-15) under certain conditions. The Control Processor can assert N_RESET by writing a '1' to the RESET_COP8 register (lines 402-4 to 402-6). The Control Processor can allow an assertion of the Target's N_TRESET signal to assert N_RESET during emulation mode by writing a '0' to the DISABLE_TAR_RST register (lines 402-7 to 402-9). And finally, the Control Processor can allow an assertion of the Target's N_TRESET signal to assert N_RESET to start an emulation by writing a '1' to the START_EM_TRST register (lines 402-10 to 402-13). When N_RESET is asserted, this block asserts RESET (line 402-14) to be used as part of the RESET_ACTIVE logic (line 401-52).

8.3 Pout Pin (Block 403) Logic Equations and Explanation 8.3.1 COP8 Interface

| | |
|---|---|
| 403-1 | POUT = G1; |

8.3.2 Recreated Port Registers

| | |
|---|---|
| 403-2 | TG_CONFIG0.d = POUT; |
| 403-3 | TG_CONFIG0.clk = CLK; |
| 403-4 | TG_CONFIG0.ena = RSLOT3; |
| 403-5 | TG_CONFIG0.clr = RESET_ACTIVE |
| 403-6 | TG_CONFIG1.d = POUT; |
| 403-7 | TG_CONFIG1.clk = CLK; |
| 403-8 | TG_CONFIG1.ena = RSLOT4; |
| 403-9 | TG_CONFIG1.clr = RESET_ACTIVE |
| 403-10 | TG_CONFIG2.d = POUT; |
| 403-11 | TG_CONFIG2.clk = CLK; |
| 403-12 | TG_CONFIG2.ena = RSLOT5; |
| 403-13 | TG_CONFIG2.clr = RESET_ACTIVE |
| 403-14 | TG_CONFIG3.d = POUT; |
| 403-15 | TG_CCNFIG3.clk = CLK; |
| 403-16 | TG_CONFIG3.ena = RSLOT6; |
| 403-17 | TG_CONFIG3.clr = RESET_ACTIVE |
| 403-18 | TG_DATA0.d = POUT; |
| 403-19 | TG_DATA0.clk = CLK; |
| 403-20 | TG_DATA0.ena = RSLOT7; |
| 403-21 | TG_DATAC.clr = RESET_ACTIVE; |
| 403-22 | TG_DATA1.d = POUT; |
| 403-23 | TG_DATA1.clk = CLK; |
| 403-24 | TG_DATA1.ena = RSLOT8; |
| 403-25 | TG_DATA1.clr = RESET_ACTIVE; |
| 403-26 | TG_DATA2.d = POUT; |
| 403-27 | TG_DATA2.clk = CLK; |
| 403-28 | TG_DATA2.ena = RSLOT9; |
| 403-29 | TG_DATA2.clr = RESET_ACTIVE; |
| 403-30 | TG_DATA3.d = POUT; |
| 403-31 | TG_DATA3.clk = CLK; |
| 403-32 | TG_DATA3.ena = RSLOT10; |
| 403-33 | TG_DATA3.clr = RESET_ACTIVE; |

8.3.3 Pout Pin Flag Capture

| | |
|---|---|
| 403-34 | SLOT1_POUT.d = POUT; |
| 403-35 | SLOT1_POUT.clk = CLK; |
| 403-36 | SLOT1_POUT.ena = SLOT1; |
| 403-37 | SLOT1_POUT.clr = RESET_ACTIVE; |
| 403-38 | SLOT2_POUT.d = POUT; |
| 403-39 | SLOT2_POUT.clk = CLK; |
| 403-40 | SLOT2_POUT.ena = SLOT2; |
| 403-41 | SLOT2_POUT.clr = RESET_ACTIVE; |

8.3.4 Emulator Core Interface

| | |
|---|---|
| 403-42 | RESET_ACTIVE = OUT_FLAGS3; |
| 403-43 | POUT_FLAGS0 = SLOT1_POUT; |
| 403-44 | POUT_FLAGS1 = SLOT2_POUT; |

8.3.5 Explanation of Logic Equations

The data output on the POUT pin is used to recreate the pins that are used in the interface. Each recreated pin has two register bits (CONFIG and DATA) that are used to determine its output structure. The CONFIG register bits are output first during Slot 3 to Slot 6 and are stored in TG_CONFIG [3..0] (lines 403-2 to 403-17). The DATA register bits come out next, during Slot 7 to Slot 10 and are stored in TG_DATA[3..0] (lines 403-18 to 403-33). Both TG_CONFIG[3..0] and TG_DATA[3..0] are output to Recreated Ports block (block 405) where the pins output structures are actually recreated.

The POUT pin also outputs two flags that are used primarily to recreate the COP8 program counter as it executes. These flags are captured in two D-flops (lines 403-34 to 403-41) and are output to the Emulator Core as the POUT flag bus POUT_FLAGS[1..0] (lines 403-43 and 403-44).

8.4 Input Pin (Block 404) Logic Equations and Explanation 8.4.1 COP8 Interface

| | |
|---|---|
| 404-1 | G0 = INPUT; |
| 404-2 | INPUT = RSLOT10 .AND. .NOT. (SYNC2_CMD_ WAITING) .AND. .NOT. (INP_HW_BRK_CMD) |
| 404-3 | .OR. RSLOT1 .AND. SYNC2_CMD_WAITING |
| 404-4 | .OR. RSLOT2 .AND. .NOT. (SYNC2_CMD_WAITING .AND. TG_INP0 |
| 404-5 | .OR. RSLOT2 .AND. SYNC CMD_WAITING .AND. CMD_BUFFER0 |
| 404-6 | .OR. RSLOT3 .AND. .NOT. (SYNC2_CMD_WAITING .AND. TG_INP1 |
| 404-7 | .OR. RSLOT3 .AND. SYNC_CMD_WAITING .AND. CMD_BUFFER1 |
| 404-8 | .OR. RSLOT4 .AND. .NOT. (SYNC2_CMD_WAITING .AND. TG_INP2 |
| 404-9 | .OR. RSLOT4 .AND. SYNC_CMD_WAITING .AND. CMD_BUFFER2 |
| 404-10 | .OR. RSLOT5 .AND. .NOT. (SYNC2_CMD_WAITING .AND. TG_INP3 |
| 404-11 | .OR. RSLOT5 .AND. SYNC_CMD_WAITING .AND. CMD_BUFFER3 |
| 404-12 | .OR. RSLOT6 .AND. CMD_BUFFER4 |
| 404-13 | .OR. RSLOT7 .AND. CMD_BUFFER5 |
| 404-14 | .OR. RSLOT9 .AND. CMD_BUFFER6 |
| 404-15 | .OR. RSLOT9 .AND. CMD_BUFFER7 |
| 404-16 | .OR. .NOT. (STOP_CODE) .AND. ENABLE_CODE; |
| 404-17 | INP_HW_BRK_CMD = SYNC2_HW_BRK_CMD .OR. HW_BP; |

8.4.2 Control Processor Interface and Synchronizing Logic

| | |
|---|---|
| 404-18 | CMD_BUFFER[7 . . . 0].d = CTL_DATA[7 . . . 0]; |
| 404-19 | CMD_BUFFER[7 . . . 0].clk = N_CTL_WR; |
| 404-20 | CMD_BUFFER[7 . . . 0].ena = (CTL_ADR[7 . . . 0] == 0x01); |
| 404-21 | CMD_WAITING.d = CTL_DATA1; |
| 404-22 | CMD_WAITING.clk = N_CTL_WR; |
| 404-23 | CMD_WAITING.ena = (CTL_ADR[7 . . . 0] == 0x00); |
| 404-24 | CMD_WAITING.clr = SYNC2_CMD_WAITING; |
| 404-25 | HW_BRK_CMD.d = CTL_DATA2; |

-continued

```
404-26  HW_BRK_CMD.clk = N_CTL_WR;
404-27  HW_BRK_CMD.ena = (CTL_ACR[7 ... 0] == 0x00);
404-28  HW_BRK_CMD.clr = BREAK;
404-29  ENABLE_CLEAR.d = CTL_DATA7;
404-30  ENABLE_CLEAR.clk = N_CTL_WR;
404-31  ENABLE_CLEAR.ena = (CLT_ADR[7 ... 0] == 0x00);
404-32  SYNC1_CMD_WAITING.d = CMD_WAITING;
404-33  SYNC1_CMD_WAITING.clk = CLK;
404-34  SYNC1_CMD_WAITING.ena = RSLOT3;
404-35  SYNC1_CMD_WAITING.clr = ENABLE_CLEAR;
404-36  SYNC2_CMD_WAITING.d = SYNC1_CMD_WAITING;
404-37  SYNC2_CMD WAITING.clk = CLK;
404-38  SYNC2_CMD_WAITING.ena = RSLOT8;
404-39  SYNC2_CMD_WAITING.clr = ENABLE_CLEAR;
404-40  SYNC1_HW_BRK_CMD.d = HW_BRK_CMD;
404-41  SYNC1_HW_BRK_CMD.clk = CLK;
404-42  SYNC1_HW_BRK_CMD.ena = RSLOT3;
404-43  SYNC1_HW_BRK_CMD.clr = ENABLE_CLEAR;
404-44  SYNC2_HW_BRK_CMD.d = SYNC1_HW_BRK_CMD;
404-45  SYNC2_HW_BRK_CMD.clk = CLK;
404-46  SYNC2_HW_BRK_CMD.ena = RSLOT8;
404-47  SYNC2_HW_BRK_CMD.clr = ENABLE_CLEAR;
```

8.4.3 Enabling Code Logic

```
404-48  ENABLE_BYTE0[7 ... 0] = 0x09;
404-49  ENABLE_BYTE1[7 ... 0] = 0xCF;
404-50  ENABLE_BYTE2[7 ... 0] = 0x47;
404-51  ENABLE_CNTR[5 ... 0].d = ENABLE_CNTR[5 .. 0] + 1;
404-52  ENABLE_CNTR[5 ... 0].clk = CTL_CLK;
404-53  ENABLE_CNTR[5 ... 0].ena = .NOT. (STOP_CODE);
404-54  ENABLE_CNTR[5 ... 0].clr = ENABLE_CLEAR;
404-55  STOP_CODE = OUT_FLAGS4;
404-56  ENABLE_CODE =    (ENABLE CNTR == 0x08) .AND.
                         ENABLE_BYTE00
404-57                .OR. (ENABLE_CNTR == 0x09) .AND.
                         ENABLE_BYTE01
404-58                .OR. (ENABLE_CNTR == 0x0A) .AND.
                         ENABLE_BYTE02
404-59                .OR. (ENABLE_CNTR == 0x0B) .AND.
                         ENABLE_BYTE03
404-60                .OR. (ENABLE_CNTR == 0x0C) .AND.
                         ENABLE_BYTE04
404-61                .OR. (ENABLE_CNTR == 0x0D) .AND.
                         ENABLE_BYTE05
404-62                .OR. (ENABLE_CNTR == 0x0E) .AND.
                         ENABLE_BYTE06
404-63                .OR. (ENABLE_CNTR == 0x0F) .AND.
                         ENABLE_BYTE07
404-64                .OR. (ENABLE_CNTR == 0x10) .AND.
                         ENABLE_BYTE10
404-65                .OR. (ENABLE_CNTR == 0x11) .AND.
                         ENABLE_BYTE11
404-66                .OR. (ENABLE_CNTR == 0x12) .AND.
                         ENABLE_BYTE12
404-67                .OR. (ENABLE_CNTR == 0x13) .AND.
                         ENABLE_BYTE13
404-68                .OR. (ENABLE_CNTR == 0x14) .AND.
                         ENABLE_BYTE14
404-69                .OR. (ENABLE_CNTR == 0x15) .AND.
                         ENABLE_BYTE15
404-70                .OR. (ENABLE_CNTR == 0x16) .AND.
                         ENABLE_BYTE16
404-71                .OR. (ENABLE_CNTR == 0x17) .AND.
                         ENABLE_BYTE17
404-72                .OR. (ENABLE_CNTR == 0x18) .AND.
                         ENABLE_BYTE20
404-73                .OR. (ENABLE_CNTR == 0x19) .AND.
                         ENABLE_BYTE21
404-74                .OR. (ENABLE_CNTR == 0x1A) .AND.
                         ENABLE_BYTE22
404-75                .OR. (ENABLE_CNTR == 0x1B) .AND.
                         ENABLE_BYTE23
404-76                .OR. (ENABLE_CNTR == 0x1C) .AND.
                         ENABLE_BYTE24
404-77                .OR. (ENABLE_CNTR == 0x1D) .AND.
                         ENABLE_BYTE25
404-78                .OR. (ENABLE_CNTR == 0x1E) .AND.
                         ENABLE_BYTE26
404-79                .OR. (ENABLE_CNTR == 0x1F) .AND.
                         ENABLE_BYTE27;
```

8.4.4 Explanation of Logic Equations

The INPUT pin is used to input the ICE Hooks enabling code, commands, command data and the Recreated Port pins input values. The INPUT multiplexor (lines 404-2 to 404-16) determines what is shifted out of the ICE Logic onto the modified COP8 INPUT pin (line 404-1). If STOP_CODE is not asserted (line 404-55), the INPUT multiplexor will select the Enabling code for output. The three byte Enabling code (lines 404-48 to 404-50) is serialized using a 6-bit ENABLE_CNTR counter (lines 404-51 to 404-54) that generates 32 counts. The first eight counts output a '0' in order to prime the modified COP8 detection circuit. The next 24 counts output ENABLE_CODE (lines 404-56 to 404-79). This cycle continues until STOP_CODE is asserted. The ENABLE_CNTR is cleared by the Control Processor by it first setting and then clearing ENABLE_CLEAR (lines 404-29 to 404-31) register. This ENABLE_CLEAR register is a mirror copy of the ENABLE_CLEAR register in Block 401 (lines 401-90 to 401-92).

Monitor data is input to the ICE Monitor in the modified COP8 by the Control Processor first loading the data into CMD_BUFFER[7..0] (lines 404-18 to 404-20). The Control Processor then sets the CMD_WAITING flag (lines 404-21 to 404-24). This flag is synchronized to the modified COP8 using a two stage synchronizer SYNC1_CMD_WAITING (lines 404-32 to 404-35) and SYNC2_CMD_WAITING (lines 404-36 to 404-39). When SYNC2_CMD_WAITING becomes asserted the INPUT multiplexor shifts out the Monitor Data Command during Slot 10 and Slot 1; and shifts out the data in CMD_BUFFER during Slot 2 through Slot 9.

The Hardware Break Request signal, INP_HW_BRK_CMD (line 404-17), is asserted by either the Attribute Memory Control (Block 504) or the Control Processor. The Control Processor asserts this signal by setting the HW_BRK_CMD flag (404-25 to 404-28). This flag is synchronized to the modified COP8 using a two stage synchronizer SYNC1_HW_BRK_CMD (lines 404-40 to 404-43) and SYNC2_HW_BRK_CMD (lines 404-44 to 404-47). When SYNC2_HW_BRK_CMD becomes asserted the INPUT multiplexor shifts out the Hardware Break Request Command during Slot 10 and Slot 1.

8.5 Recreated Ports (Block 405) Logic Equations and Explanation

8.5.1 Target Interface

```
405-1  TAR_G0 = SYNC_TG_DATA0;
405-2  TAR_G0.oe = SYNC_TG_CONFIG0;
405-3  TAR_G0_WP.oe = VCC;
405-4  TAR_G0_WP.oe = .NOT. (SYNC_TG_CONFIG0) .AND.
       SYNC_TG_DATA0;
405-5  TAR_G1 = SYNC_TG_DATA1;
405-6  TAR_G1.oe = SYNC_TG_CONFIG1;
405-7  TAR_G1 _WP = VCC;
405-9  TAR_G1 WP.oe = .NOT. (SYNC_TG_CONFIG1) .AND.
       SYNC_TG_DATA1;
```

-continued

| | |
|---|---|
| 405-9 | TAR_G2 = SYNC_TG_DATA2; |
| 405-10 | TAR_G2.oe = SYNC_TG_CONFIG2; |
| 405-11 | TAR_G2_WP = VCC; |
| 405-12 | TAR_G2_WP.oe = .NOT. (SYNC_TG_CONFIG2) .AND. SYNC_TG_DATA2; |
| 405-13 | TAR_G3 = TG_DATA3; |
| 405-14 | TAR_G3.oe = SYNC_TG_CONFIG3; |
| 405-15 | TAR_G3_WP = VCC; |
| 405-16 | TAR_G3_WP.oe = .NOT. (SYNC_TG_CONFIG3) .AND. TG_DATA3; |

8.5.2 Recreated Port Output Registers

| | |
|---|---|
| 405-17 | SYNC_TG_CONFIG[3 . . . 0].d = TG_CONFIG[3 . . . 0]; |
| 405-18 | SYNC_TG_CONFIG[3 . . . 0].clk = CLK; |
| 405-19 | SYNC_TG_CONFIG[3 . . . 0].ena = RSLOT10; |
| 405-20 | SYNC_TG_CONFIG[3 . . . 0].clr = RESET_ACTIVE; |
| 405-21 | SYNC_TG_DATA[2 . . . 0].d = TG_DATA[2 . . . 0]; |
| 405-22 | SYNC_TG_DATA[2 . . . 0].clk = CLK; |
| 405-23 | SYNC_TG_DATA[2 . . . 0].ena = RSLOT10; |
| 405-24 | SYNC_TG_DATA[2 . . . 0].clr = RESET_ACTIVE; |

8.5.3 Recreated Port Input Register

| | |
|---|---|
| 405-25 | TG_INP[3 . . . 0].d = TAR_G[3 . . . 0]; |
| 405-26 | TG_INP[3 . . . 0].clk = CLK; |
| 405-27 | TG_INP[3 . . . 0].ena = RSLOT1; |

8.5.4 Emulator Core Interface

| | |
|---|---|
| 405-28 | RESET_ACTIVE = OUT_FLAGS3; |

8.5.5 Explanation of Logic Equations

The Recreated Ports' Target Interface (lines 405-1 to 405-16) supports the four configurations of each port pin independently. Each port pin is recreated using two output buffers, both of which can be tri-stated. One of the buffers, the data buffer, is used to output the data value of the port. The other buffer, the weak pull-up buffer, is used to enable a weak pull-up resistor. To recreate a port that is outputting a data value, the output enable of the data buffer is asserted (lines 405-2, 405-6, 405-10 and 405-14) with the data value on the buffer's input (lines 405-1, 405-5, 405-9 and 405-13). When a data value is being output, the weak pull-up buffer is tri-stated. To recreate a weak pull-up port, the output enable of the data buffer is de-asserted and the output enable of the weak pull-up buffer is asserted (lines 405-4, 405-8, 405-12 and 405-16). The weak pull-up buffer's input (lines 405-3, 405-7, 405-11 and 405-15) is tied to Vcc to enable it to source current through a 330 Kohm resistor to simulate the COP8's weak pull-up port structure. To recreate an input port, the output enables of both buffers are de-asserted.

The Recreated Port data that is shifted out by the modified COP8 on the POUT pin and captured in the POUT Interface (Block 403) are clocked into the Recreated Configuration and Data registers (lines 405-17 to 405-24). These registers are used to control the data and weak pull-up output buffers. These Recreated Port registers are asynchronously cleared whenever Reset is asserted (line 405-28).

The data values on the Recreated Port target pins are clocked into an Input register (lines 405-25 to 405-27) and are fed to the INPUT Pin Interface (Block 404) which inputs the data to the modified COP8.

8.6 Control Processor Interface (Block 407) Logic Equations and Explanation

8.6.1 Emulator Core Interface

| | |
|---|---|
| 407-1 | CTL_DATA[7 . . . 0] = CP_DATA[7 . . . 0]; |
| 407-2 | CTL_DATA[7 . . . 0].oe = .NOT. (N_CTL_WR); |
| 407-3 | CP_DATA[7 . . . 0] = CTL_DATA[7 . . . 0]; |
| 407-4 | CP_DATA[7 . . . 0].oe = .NOT. (N_CTL_RD); |
| 407-5 | CTL_ADR[7 . . . 0].d = CP_DATA[7 . . . 0]; |
| 407-6 | CTL_ADR[7 . . . 0].clk = .NOT. (CP_ALE); |
| 407-7 | N_CTL_RD = N_CPRD; |
| 407-8 | N_CTL_WR = N_CPWR; |
| 407-9 | CTL_CLK = CP_CLK; |
| 407-10 | CP_BREAK = BREAK; |

8.6.2 Explanation of Logic Equations

The Control Processor interface uses a conventional microprocessor interface with an 8-bit multiplexed address and data bus. The Read (N_CTL_RD) and Write (N_CTL_WR) control lines control bi-directional data flow. When N_CTL_WR is asserted, the Control Processor is writing data to the ICE Logic (lines 407-1 and 407-2). Conversely, when N_CTL_RD is asserted the Control Processor is reading data from the ICE Logic (lines 407-3 and 407-4).

The address is captured off the bus using the Address Latch Enable (CP_ALE) control line (lines 407-5 and 407-6). The Read and Write control lines, as well as a free running clock, are buffered and output to the ICE Logic core. The Break state is output from the ICE Logic to the Control Processor as a status signal (line 407-10).

Those skilled in the field of the present invention and having the benefit of this disclosure will recognize that the terms pin and pins, as used herein, may refer to a connection terminal and the circuitry associated with that connection terminal. Such terminology is common and well understood in this field. Furthermore, those skilled in this field and having the benefit of this disclosure will recognize that the terms pin and pins, are often used to refer to the connection terminals of a packaged integrated circuit. Other types of connection terminals, including but not limited to, lands, solder balls, and solder bumps, may also be used to provide signal pathways between an integrated circuit and one or more external circuit elements.

The present invention may be implemented with various changes and substitutions to the illustrated embodiments. Such changes may include, but are not limited to, implementing the present invention with different codes for the instruction set changes, effecting breakpoints using on-chip hardware comparators instead of a break instruction, storing the Monitor program in different types of memory, and changing the number of I/O pins that communicate with the ICE logic. Importantly, the present invention is not limited to use with the COP8 microcontroller, but may be used generally with a microcontroller which does not provide access to internal address and data busses.

It will be readily understood by those skilled in the art that various other changes in the details, materials, and arrangements of the parts and operations which have been described and illustrated in order to explain the nature of this invention may be made without departing from the principles and scope of the invention as set forth in the claims.

What is claimed is:

1. An in-circuit emulation system, comprising
   a) a target system;
   b) an external circuit;
   c) a microcontroller contained in said target system comprising:

(1) a processing unit, can
(2) a plurality of I/O ports that interface to circuits on said target system;
d) a memory from which said microcontroller executes a program
e) means for one or more of said I/O ports to be reconfigured to interface with said external circuit;
f) means for coupling the reconfigured I/O ports to said external circuit;
g) means for said external circuit to recreate port functionality of said reconfigured I/O ports;
h) means for coupling the recreated port functionality to said target system;
i) means for said external circuit to load said program into said memory;
j) means for said microcontroller to execute said program under the control of said external circuit;
whereby said microcontroller excludes dedicated ports to interface to said external circuit and said microcontroller will be emulated in said target system while maintaining all the functionality of its said I/O ports.

2. The in-circuit emulation system of claim 1, wherein said memory is integrated on-chip with said microcontroller.

3. The in-circuit emulation system of claim 2, wherein said memory is a non-volatile memory.

4. The in-circuit emulation system of claim 1, wherein said external circuit comprises an FPGA.

5. The in-circuit emulation system of claim 1, further comprising means for said external circuit to recreate the program counter of said microcontroller as said program executes.

6. The in-circuit emulation system of claim 5, further comprising a first trace memory coupled to said external circuit to capture the recreated program counter.

7. The in-circuit emulation system of claim 5, further comprising a first control circuit coupled to said external circuit providing breakpoints, triggers and other actions based on said recreated program counter.

8. The in-circuit emulation system of claim 1, wherein said microcontroller further comprising:
(1) a data memory,
(2) a plurality of registers.

9. The in-circuit emulation system of claim 8, further comprising means for said external circuit to recreate a first data contained in said data memory as said program executes.

10. The in-circuit emulation system of claim 8, further comprising means for said external circuit to recreate a second data of one or more of said registers as said program executes.

11. The in-circuit emulation system of claim 8, further comprising a second trace memory to capture said first data and said second data.

12. The in circuit emulation system of claim 8, further comprising a second control circuit coupled to said external circuit providing breakpoints, triggers and other actions based on said first data and said second data.

13. The in-circuit emulation system of claim 1, wherein said microcontroller further comprising a monitor memory containing means for executing commands from said external circuit.

14. The in-circuit emulation system of claim 1 wherein means for coupling between said microcontroller and said external circuit comprising:
(1) a pattern on said target system with two parallel rows of connections;
(2) a first row of said connections connecting to said reconfigured I/O ports of said microcontroller;
(3) a second row of said connections connecting to said recreated port functionality of said external circuit;
(4) the connections of said first row and said second row are aligned in such a manner so as the connection of the recreated port is directly opposite the connection of the reconfigured I/O port that it recreates;
whereby shorting opposing connections of said parallel rows of connections reconfigures said in-circuit emulation system into a production system.

15. The in-circuit emulation system of claim 1, wherein said means for coupling between said microcontroller and said external circuit comprises a wireless interface.

16. An in-circuit emulation system, comprising
a) a target system;
b) an external circuit;
c) a microcontroller contained in said target system comprising:
(1) a processing unit,
(2) a plurality of I/O ports that interface to circuits on said target system;
d) a memory from which said microcontroller executes a program
e) a first connector on said target system for coupling one or more of said I/O ports to said external circuit;
f) said external circuit outputs a predetermined pattern to said I/O ports causing said microcontroller to reconfigure one or more of said I/O ports to interface with said external circuit;
g) said microcontroller outputs a first data on the reconfigured I/O ports to enable said external circuit to recreate port functionality of said reconfigured I/O ports;
h) a second connector on said target system for coupling the recreated port functionality to said target system;
i) said external circuit outputs a second data to said reconfigured I/O ports causing said microcontroller to write said second data into said memory;
j) said external circuit outputs a third data to said reconfigured I/O ports causing said microcontroller to execute instructions from said memory;
whereby said microcontroller contained in said target system will be emulated while maintaining all the functionality of its said I/O ports and excluding dedicated ports to interface to said external circuit.

17. The in-circuit emulation system of claim 16, wherein said memory is integrated on-chip with said microcontroller.

18. The in-circuit emulation system of claim 16, wherein said memory is a non-volatile memory.

19. The in-circuit emulation system of claim 16, wherein said external circuit comprises an FPGA.

20. The in-circuit emulation system of claim 16, further comprising said microcontroller outputting a third data on said reconfigured I/O ports to enable said external circuit to recreate the program counter of said microcontroller as said program executes.

21. The in-circuit emulation system of claim 20, further comprising a first trace memory whereby said external circuit writes the recreated program counter into said first trace memory.

22. The in-circuit emulation system of claim 20, further comprising a first control circuit coupled to said external circuit wherein said first control circuit compares said recreated program counter to supplied values providing breakpoints, triggers and other actions.

23. The in-circuit emulation system of claim 16, wherein said microcontroller further comprising:
(1) a data memory
(2) a plurality of registers.

24. The in-circuit emulation system of claim 23, further comprising said microcontroller outputting a fourth data on said reconfigured I/O ports to enable said external circuit to recreate said data memory as said program executes.

25. The in-circuit emulation system of claim 23, further comprising said microcontroller outputting a fifth data on said reconfigured I/O ports to enable said external circuit to recreate one or more of said registers as said program executes.

26. The in-circuit emulation system of claim 23, further comprising a second trace memory whereby said external circuit writes the recreated data memory and one or more of the recreated registers into said second trace memory.

27. The in-circuit emulation system of claims 23, further comprising a second control circuit coupled to said external circuit wherein said second control circuit compares one or more locations of said recreated data memory and one or more said recreated registers to supplied values providing breakpoints, triggers and other actions.

28. The in-circuit emulation system of claim 23, wherein said microcontroller further comprising a monitor memory executing control routines based on a sixth data input on said reconfigured I/O ports from said external circuit.

29. The in-circuit emulation system of claim 16, wherein said first connector and said second connector on said target system comprising:
(1) said first connector is patterned on said target system as a first row of connections;
(2) said second connector is patterned on said target system as a second row of connections;
(3) said first row of connections and said second row of connections are placed parallel to each other a predetermined distance apart;
(4) the connections of said first row and said second row are aligned in such a manner so as the connection of a recreated port is directly opposite the connection of the reconfigured I/O port that it recreates;
whereby shorting opposing connections of the parallel rows of connections reconfigures said in-circuit emulation system into a production system.

30. The in-circuit emulation system of claim 16, wherein said connector on said target system comprises a wireless interface.

31. A method of emulating a microcontroller in a target system, comprising
a) providing means of communication between said microcontroller and an external circuit;
b) providing means of reconfiguring I/O ports of said microcontroller to interface with said external circuit;
c) providing a memory from which said microcontroller will execute a program;
d) providing means for said external circuit to load said program in said memory;
e) providing means for said external circuit to control where said microcontroller will start and stop executing said program;
f) providing means for the reconfigured I/O ports of said microcontroller to be recreated by said external circuit;
g) providing means for the recreated I/O ports to replace said reconfigured I/O ports on said target system;
whereby said microcontroller will be emulated in said target system while maintaining all functionality of its said I/O ports and excluding dedicated ports to interface to said external circuit.

32. The method of claim 31, further providing means for said external circuit to recreate the program counter of said microcontroller.

33. The method of claim 32, further providing means for capturing said program counter in a first trace memory.

34. The method of claim 32, further providing means for performing breakpoints, triggers and other actions based on said program counter.

35. The method of claim 31, further providing means for said external circuit to recreate one or more locations of a data memory of said microcontroller creating a first data.

36. The method of claim 31, further providing means for said external circuit to recreate one or more registers of said microcontroller creating a second data.

37. The method of claim 31, further providing means for storing said first data and said second data in a second trace memory.

38. The method of claim 31, further providing means for performing breakpoints, triggers and other actions based on said first data and said second data.

39. The method of claim 31, further providing means for said target system to be used either as an in-circuit emulation system or a production system.

* * * * *